(12) United States Patent
Asano et al.

(10) Patent No.: US 10,657,836 B2
(45) Date of Patent: May 19, 2020

(54) INFORMATION PROCESSING DEVICE AND INFORMATION PROCESSING METHOD FOR ESTIMATION OF ACCEPTANCE ABILITY

(71) Applicant: SONY CORPORATION, Tokyo (JP)

(72) Inventors: Yasuharu Asano, Kanagawa (JP); Noriyuki Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 404 days.

(21) Appl. No.: 13/858,291

(22) Filed: Apr. 8, 2013

(65) Prior Publication Data

US 2013/0309646 A1 Nov. 21, 2013

(30) Foreign Application Priority Data

May 21, 2012 (JP) ................................ 2012-115605

(51) Int. Cl.
| | | |
|---|---|---|
| *G09B 7/00* | (2006.01) | |
| *G09B 19/00* | (2006.01) | |
| *G09B 3/00* | (2006.01) | |
| *G09B 5/08* | (2006.01) | |

(52) U.S. Cl.
CPC ............... *G09B 7/00* (2013.01); *G09B 3/00* (2013.01); *G09B 5/08* (2013.01); *G09B 19/00* (2013.01)

(58) Field of Classification Search
CPC ........................................................ G09B 7/00
USPC ................................................ 434/350, 362
See application file for complete search history.

(56) References Cited

U.S. PATENT DOCUMENTS

| | | | | |
|---|---|---|---|---|
| 3,748,754 A | * | 7/1973 | LaBerge | G09B 7/08 434/335 |
| 6,986,664 B1 | * | 1/2006 | Thomas | G09B 7/06 434/118 |
| 8,064,817 B1 | * | 11/2011 | Ziv-El | 434/319 |
| 8,340,568 B2 | * | 12/2012 | Fadel | G09B 7/02 434/350 |
| 8,834,166 B1 | * | 9/2014 | Ionkov | G06F 17/30595 434/178 |
| 2003/0180696 A1 | * | 9/2003 | Berger | G09B 23/28 434/178 |
| 2004/0014016 A1 | * | 1/2004 | Popeck | G09B 7/02 434/322 |
| 2005/0053904 A1 | * | 3/2005 | Shephard | G09B 7/00 434/236 |
| 2005/0191605 A1 | * | 9/2005 | Nguyen | G09B 7/02 434/188 |
| 2005/0196730 A1 | * | 9/2005 | Kellman | G09B 7/00 434/118 |

(Continued)

FOREIGN PATENT DOCUMENTS

| | | |
|---|---|---|
| JP | 2006-23506 A | 1/2006 |
| JP | 2009-075469 A | 4/2009 |
| JP | 2011-007963 A | 1/2011 |

*Primary Examiner* — James B Hull
(74) *Attorney, Agent, or Firm* — Chip Law Group

(57) ABSTRACT

There is provided an information processing device including an operation history acquisition unit for acquiring operation history information in which an input operation of a learner terminal by a learner who uses learning content is associated with a time at which the input operation is acquired, and an acceptance ability estimation unit for estimating an acceptance ability of the learner with regard to the learning content based on the operation history information.

13 Claims, 16 Drawing Sheets

(56) References Cited

U.S. PATENT DOCUMENTS

| | | | |
|---|---|---|---|
| 2006/0194182 A1* | 8/2006 | Anand | G09B 7/06 434/322 |
| 2007/0042335 A1* | 2/2007 | Tidwell-Scheuring et al. | 434/350 |
| 2007/0254270 A1* | 11/2007 | Hersh | G09B 7/00 434/236 |
| 2009/0142743 A1* | 6/2009 | Adachi | G09B 7/06 434/362 |
| 2010/0003658 A1* | 1/2010 | Fadel | G09B 7/02 434/322 |
| 2010/0299137 A1* | 11/2010 | Abe | G10L 25/48 704/9 |
| 2011/0217687 A1* | 9/2011 | Yeh et al. | 434/362 |
| 2011/0270883 A1* | 11/2011 | Bukai et al. | 707/777 |
| 2012/0288845 A1* | 11/2012 | Kumar Gl | G09B 7/06 434/362 |
| 2013/0004930 A1* | 1/2013 | Sorenson et al. | 434/350 |
| 2013/0252215 A1* | 9/2013 | Wu | A61B 5/162 434/236 |
| 2013/0280681 A1* | 10/2013 | Narayan et al. | 434/127 |
| 2014/0272889 A1* | 9/2014 | Kulkarni et al. | 434/350 |

\* cited by examiner

INFORMATION PROCESSING DEVICE AND INFORMATION PROCESSING METHOD FOR ESTIMATION OF ACCEPTANCE ABILITY

BACKGROUND

The present disclosure relates to an information processing device and an information processing method.

In recent years, electronic learning has become increasingly popular in learning. For example, learning materials such as textbooks are being provided in an electronic format. Thus, interaction such as a decision of correct and wrong answers to questions that was made between learners and teachers in former times is performed automatically by a computer in recent years, and interaction between learners and teachers through a communication line is becoming a common practice.

In such an electronically supported learning, techniques have been proposed for grasping in more detail the situation of students (learners) and for providing learning materials or exercises more appropriately according to the situation. These techniques are disclosed in Japanese Patent Application Laid-Open Publication Nos. 2011-7963, 2006-23506, and 2009-75469.

SUMMARY

In the above Japanese Patent Application Laid-Open Publication Nos. 2011-7963, 2006-23506, and 2009-75469, the technique is disclosed for estimating the situation of a learner who is now being learned based on biological information such as heart rate and skin temperature of the learner. However, in the above-mentioned technique, a device for measuring biological information is provided to a learner, which often results in subjecting the learner to discomfort and inconvenience.

In addition, the mental state of a learner is estimated by biological information, but this does not necessarily indicate the learning progress in the sense of the acquisition of learning content. Therefore, in the above-mentioned technique, the acquisition of learning content is dependent on the determination by test results (correct or wrong answers). This determination of acquisition based on the test results does not identify, for example, the case where an answer is correct but a process to obtain the result is incorrect, and thus this determination method has led to large errors and insufficient.

Therefore, in accordance with an embodiment of the present disclosure, there is provided a novel and improved information processing device and information processing method which can obtain more easily the useful indicator for supporting the learning.

According to an embodiment of the present disclosure, there is provided an information processing device including an operation history acquisition unit for acquiring operation history information in which an input operation of a learner terminal by a learner who uses learning content is associated with a time at which the input operation is acquired, and an acceptance ability estimation unit for estimating an acceptance ability of the learner with regard to the learning content based on the operation history information.

Further, according to an embodiment of the present disclosure, there is provided an information processing method including acquiring operation history information in which an input operation of a learner terminal by a learner who uses learning content is associated with a time at which the input operation is acquired, and estimating an acceptance ability of the learner with regard to the learning content based on the operation history information.

According to the above configuration, because information to be used for the estimation is the operation history information, it is possible to obtain information more easily without burdening the learner. In addition, acceptance ability of a learner for learning content is estimated, and thus this can be easily applied to instruction of an administrator, making up an exercise, and so on.

In accordance with the embodiments of the present disclosure described above, it is possible to obtain more easily the useful indicator for supporting the learning.

DETAILED DESCRIPTION OF THE EMBODIMENT(S)

Figure 1:
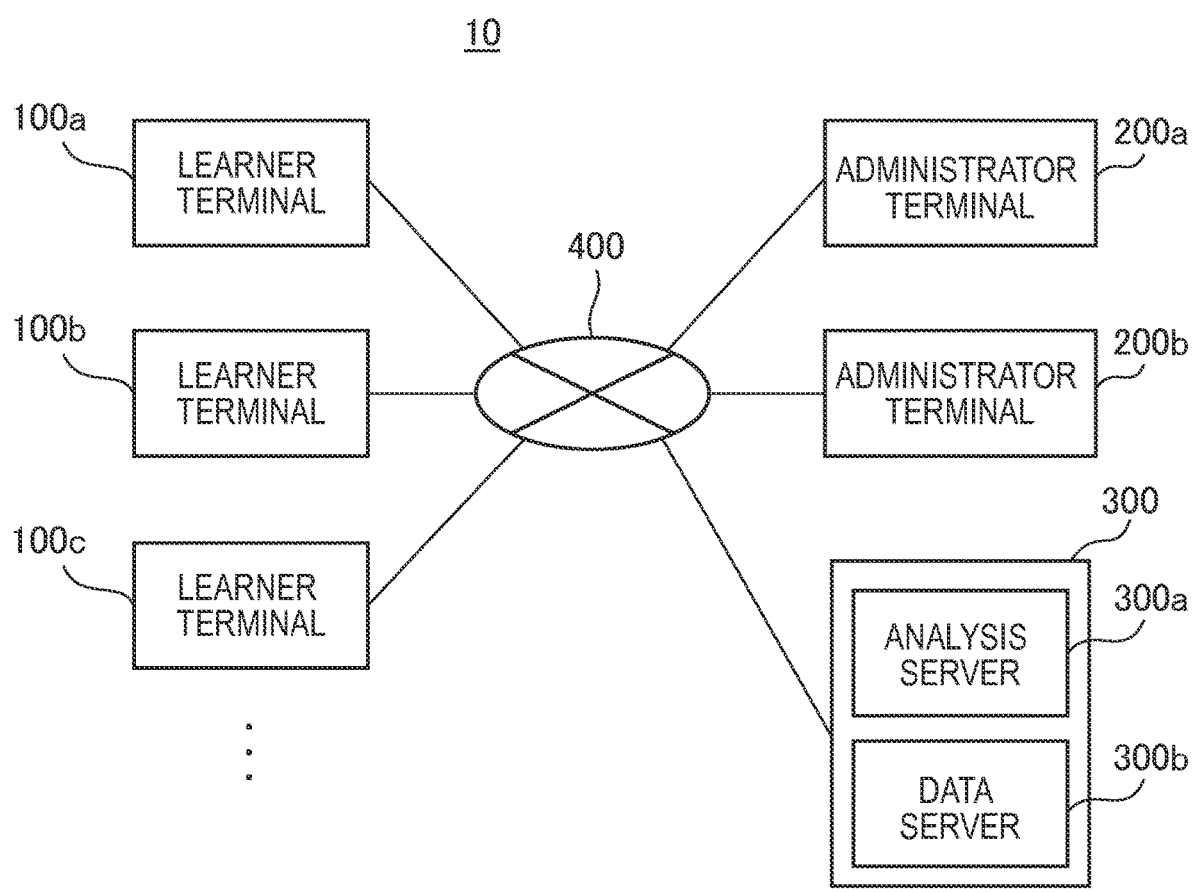
FIG. 1 is a schematic diagram illustrating an exemplary configuration of a learning system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. First Embodiment
1-1. Configuration of Learning System
1-2. Configuration of Each Device
1-3. Processing Flow
1-4. Estimation of Understanding Level
1-5. Estimation of Thinking Ability
1-6. Selection of Exercises
2. Second Embodiment
3. Third Embodiment
4. Hardware Configuration
5. Supplement 1. First Embodiment A first embodiment of the present disclosure will now be described with reference to FIG. 1 to FIG. 12.

(1-1. Configuration of Learning System)

FIG. 1 is a schematic diagram illustrating a configuration of a learning system according to the first embodiment of the present disclosure. Referring to FIG. 1, a learning system 10 includes a learner terminal 100, an administrator terminal 200, and a server 300. The learner terminal 100, the administrator terminal 200, and the server 300 are connected with each other by various types of wired or wireless networks 400.

The learner terminal 100 is used by a learner who makes use of the learning system 10. A learner may be, for example, a student in the case of learning at a school. As described later, the learner terminal 100 has the function of an input unit and a display unit, and provides the function of, for example, textbooks, notebooks, or the like to a learner. As the illustrated example, the learning system 10 may include a plurality of learner terminals 100 (e.g., learner terminals 100a, 100b and 100c; the number of learner terminals is not limited thereto).

The administrator terminal 200 is used by a learning administrator who makes use of the learning system 10. The administrator may be, for example, a teacher in the case of learning at a school. As described later, the administrator terminal 200 also has the function of an input unit and a display unit, and provides the function of administrating the learning progress of a learner to the administrator. As the illustrated example, the learning system 10 may include a plurality of administrator terminals 200 (e.g., administrator terminals 200a and 200b; the number of administrator terminals is not limited thereto).

The server 300 stores and processes information obtained from the learner terminal 100 and the administrator terminal 200, and the server 300 provides appropriate information to these terminals. As described later, the server 300 has the function of an operation history DB, learning content DB, an acceptance ability estimation unit, and so on. The server 300 can estimate acceptance ability of a learner for learning content based on an operation history of the learner terminal 100. In the illustrated example, the server 300 may be implemented by a combination of an analysis server 300a and a data server 300b. The analysis server 300a includes the acceptance ability estimation unit, and the data server 300b includes the operation history DB. However, the function of the server 300 may be implemented by a single device connected to the network 400, or it may be implemented by any number of devices to work together.

The learning system 10 may be used for learning, for example, in an environment where a learner and an administrator are present in the same place. In this case, the learner terminal 100 and the administrator terminal 200 are placed in the same place. The server 300 also may be placed in the same place. An example of this may include an example of learning and teaching at a school where a student who is a learner and a teacher who is an administrator are both present in the classroom.

Alternatively, the learning system 10 may also used for learning, for example, in an environment where a learner and an administrator are present in different places. In this case, the learner terminal 100 and the administrator terminal 200 are placed in the different places. An example of this may include an example of self-studying at a school where a student who is a learner is self-studying at a classroom and a teacher who is an administrator supervises the self-studying at a different classroom. In addition, as a similar example, an example of this may include an example where a learner uses e-learning materials at home.

Figure 2:
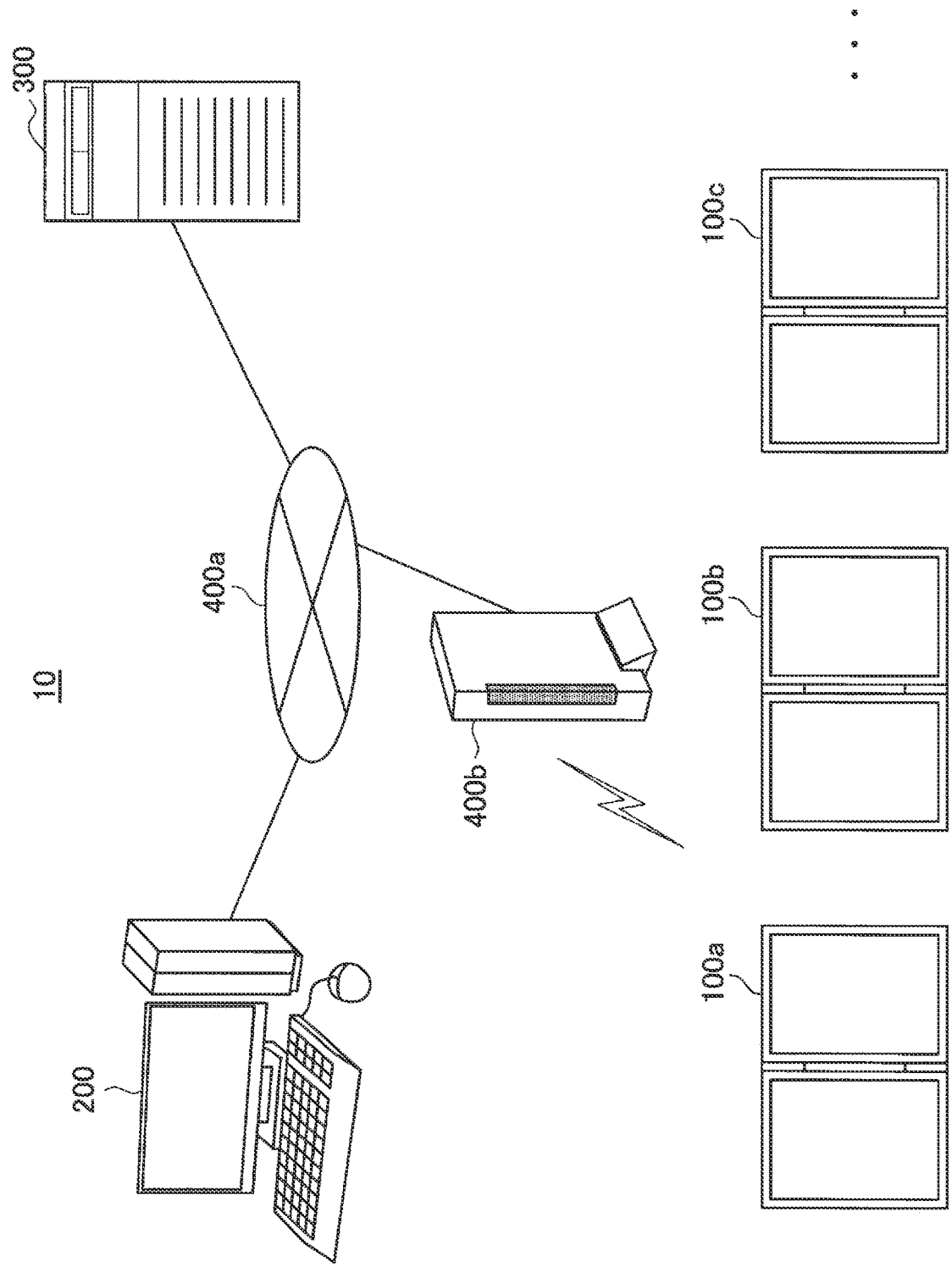
FIG. 2 is a diagram illustrating an example of the implementation of the learning system according to the first embodiment of the present disclosure.

FIG. 2 is a diagram illustrating an example of the implementation of the learning system according to the first embodiment of the present disclosure. In the learning system 10 of the illustrated example, the learner terminal 100 is a notebook type terminal device having two displays. The learner terminal 100 may be a dedicated terminal of the learning system 10. The learner terminal 100 also may be a general-purpose terminal such as notebook PCs (Personal Computers), tablet PCs, and smart phones.

On the other hand, in the illustrated example, the administrator terminal 200 is a desktop PC type terminal device that includes a keyboard, a mouse, and a display connected to a main body. The administrator terminal 200 may be a dedicated terminal of the learning system 10. The administrator terminal 200 also may be a general-purpose terminal such as various types of PCs or smart phones.

In the illustrated example, the network 400 that interconnects the learner terminal 100, the administrator terminal 200, and the server 300 includes the Internet 400a and an access point 400b. The access point 400b is accessed by the learner terminal 100 using wireless communication such as Wi-Fi (Wireless Fidelity; registered trademark).

(1-2. Configuration of Each Device)
(Functional Configuration of Learner Terminal and Administrator Terminal)

Figure 3:
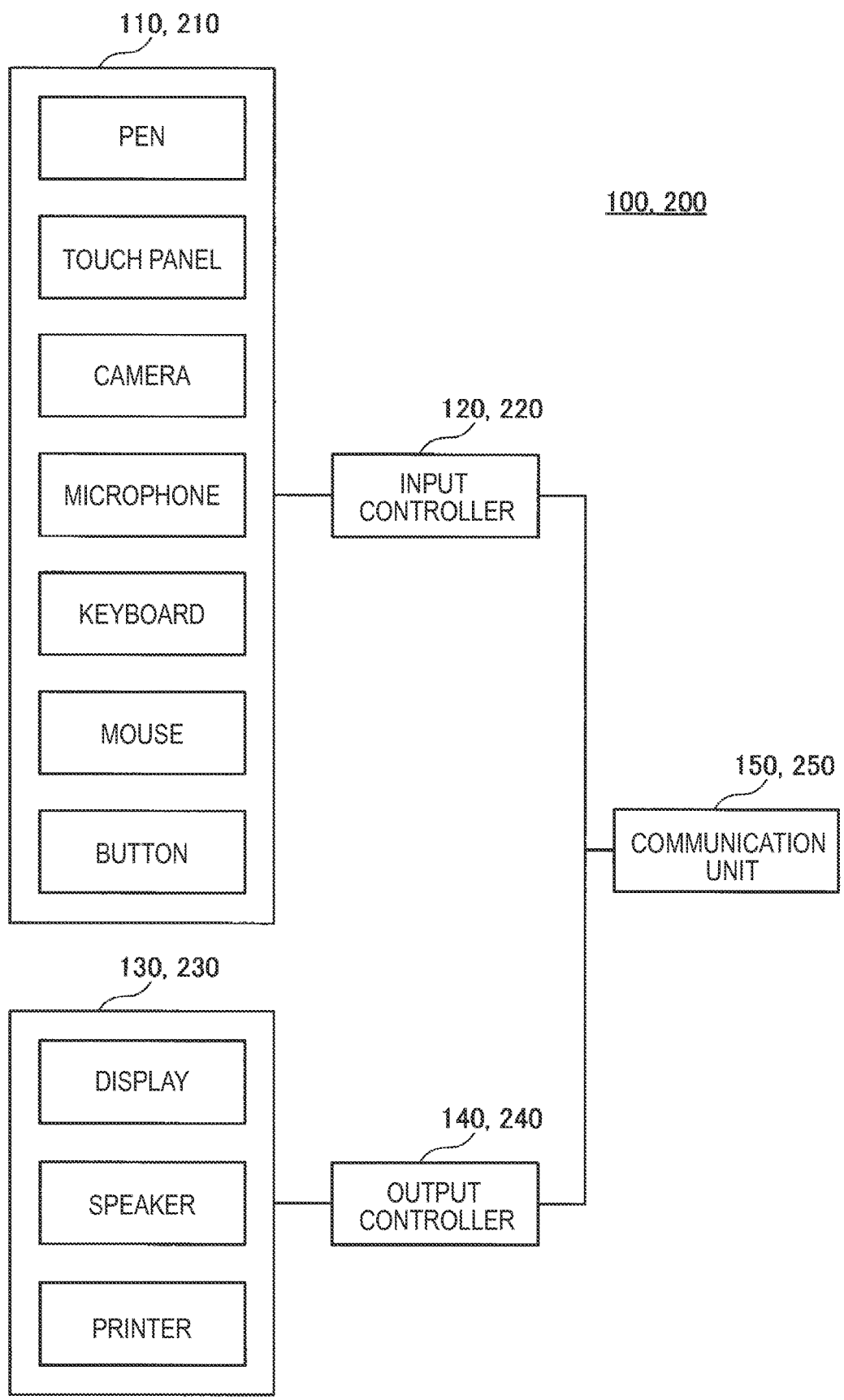
FIG. 3 is a block diagram illustrating a schematic functional configuration of a learner terminal and an administrator terminal according to the first embodiment of the present disclosure.

FIG. 3 is a block diagram illustrating a schematic functional configuration of the learner terminal and the administrator terminal according to the first embodiment of the present disclosure. Referring to FIG. 3, the learner terminal 100 includes an input unit 110, an input controller 120, an output unit 130, an output controller 140, and a communication unit 150. The administrator terminal 200 includes an input unit 210, an input controller 220, an output unit 230, an output controller 240, and a communication unit 250. In addition, these functional configurations may be implemented, for example, using a hardware configuration of the information processing device to be described later. For example, the input controllers 120, 220 and the output controllers 140, 240 may be implemented in software using a CPU (Central Processing Unit), a RAM (Random Access Memory), a ROM (Read Only Memory), and so on.

As illustrated, the learner terminal 100 and the administrator terminal 200 may have similar functional configuration. Thus, functional configuration of the learner terminal 100 will be described, so the description of similar functional configuration of the administrator terminal 200 is omitted. In addition, for example, a detailed explanation of components included in the respective input units and output units may be different between the learner terminal 100 and the administrator terminal 200.

The input unit 110 obtains various types of user input operations performed for the learner terminal 100. The input unit 110 may include, for example, a pen, a touch panel, a camera, a microphone, a keyboard, a mouse, buttons, and so on. Among them, a pen may be used in combination with a touch panel provided on a display. For example, the pen may allow a user to enter texts or graphics by hand and to select operation menus that is represented on a display as a GUI (Graphical User Interface).

The input controller 120 processes input operations obtained by the input unit 110. For example, the input controller 120 provides input operations to the output controller 140 and then the output controller 140 can reflect it to the displayed portion by a display included in the output unit 130. The input operations may include texts or graphics obtained by a pen, a touch panel, a keyboard, a mouse, or the like which may be provided in the input unit 110. In addition, the input controller 120 provides information regarding a predetermined input operation obtained by the input unit 110 to the communication unit 150 for transmitting it to the administrator terminal 200 or the server 300. In this case, the input controller 120 provides the information in association with the time at which the input operation is obtained.

The output unit 130 outputs various types of information to a learner who is a user. The output unit 130 may include, for example, a display, a speaker, a printer, or the like. The output unit 130 displays images such as a textbook, a notebook, or the like on the display. In addition, texts, graphics, or the like may be displayed on the display in response to input operations of a learner obtained by the input unit 110. In addition, the display may be, for example, a LCD (Liquid Crystal Display), a PDP (Plasma Display Panel) or a CRT (Cathode Ray Tube) display, or an electronic paper display.

The output controller 140 controls the output of information from the output unit 130. For example, the output controller 140 updates a representation of the display included in the output unit 130 according to information provided from the input controller 120 or communication unit 150. More specifically, the output controller 140 obtains information regarding input operations such as texts or graphics obtained by the input unit 110 from the input controller 120, and then the output controller 140 displays the texts or graphics on the display. In addition, the output controller 140 may obtain information of an instruction that is relevant to the learning received from the administrator terminal 200, or information that is relevant to acceptance ability, learning content or the like of a learner received from the server 300. The output controller 140 may obtain the information or the like from the communication unit 150. The output controller 140 also may change a representation of the display or may output information from a speaker or a microphone, based on the obtained information or the like.

The communication unit 150 is implemented using a communication device, and transmits and receives data to and from other devices. As described above, for example, the communication unit 150 transmits information relevant to input operations of a learner obtained from the input controller 120 to the administrator terminal 200 or the server 300. In addition, the communication unit 150 receives information of an instruction relevant to the learning received from the administrator terminal 200, and provides the information to the output controller 140. Further, the communication unit 150 receives information relevant to acceptance ability, learning content or the like of a learner received from the server 300, and provides it to the output controller 140.

(Exemplary Display of Learner Terminal)

Figure 4:
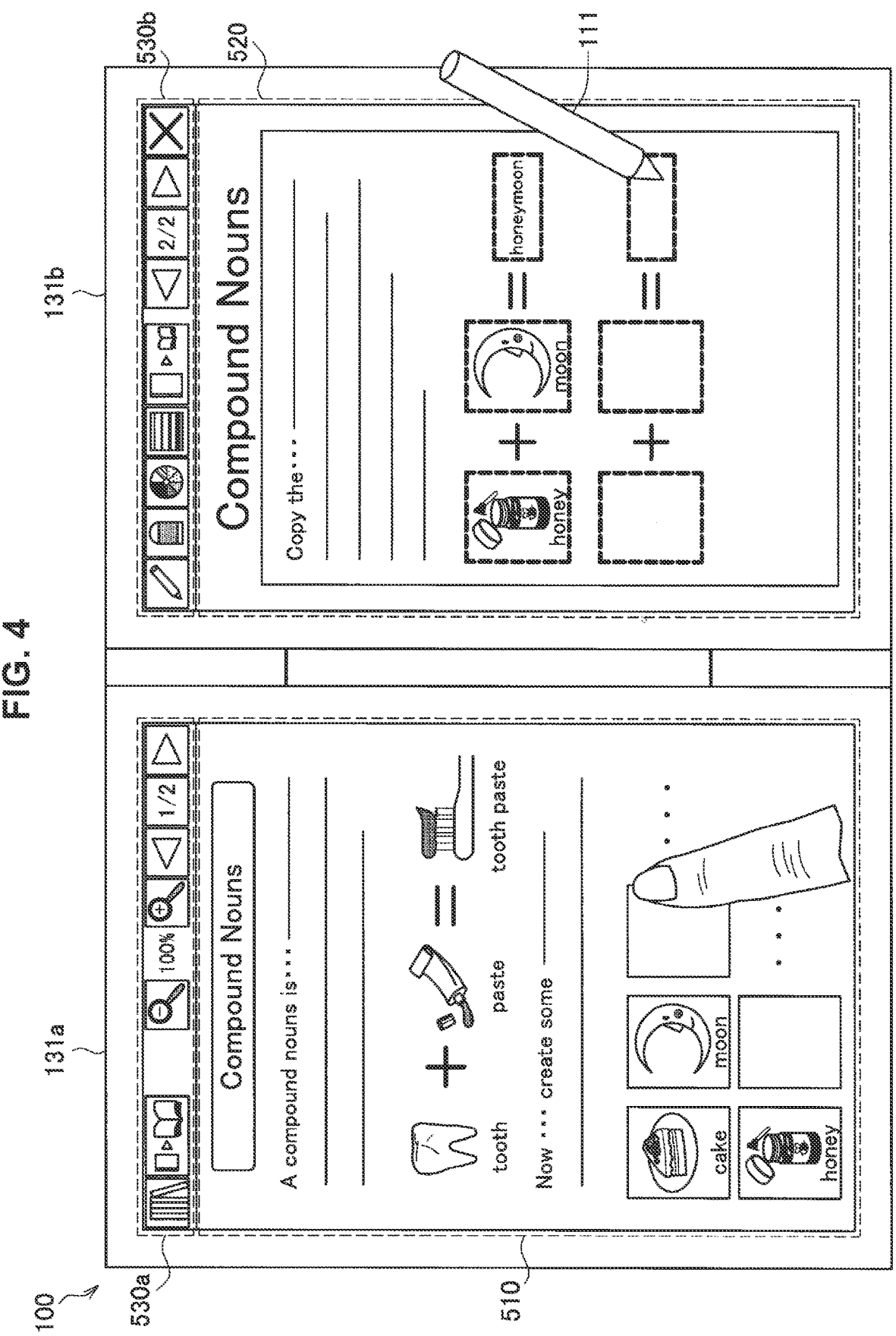
FIG. 4 is a diagram illustrating an example of the display of the learner terminal according to the first embodiment of the present disclosure.

FIG. 4 is a diagram illustrating an exemplary display of the learner terminal according to the first embodiment of the present disclosure. In the illustrated example, the learner terminal 100 includes two displays 131*a* and 131*b* as the output unit 130. In addition, the learner terminal 100 is not limited to a terminal device having two displays. Further, while an example of the input unit 110 may include the pen 111, this is not meant that the learner terminal 100 substantially includes the pen 111. The learner terminal 100 may not necessarily have a configuration in which a handwriting input is possible. The learner terminal 100 may have a configuration in which an input is possible only using a touch panel or hardware buttons.

The display 131*a* shows a textbook image 510 and a GUI image 530*a*. The textbook image 510 indicates the contents of a textbook of learning content that is currently being used. The GUI image 530*a* corresponds to the operation to be performed for the textbook image 510. In the illustrated example, the GUI image 530*a* that is used to select a textbook and is corresponded to the operations such as bookmark, zoom-in/zoom-out, and page turn is shown. A learner can perform a predetermined operation corresponding to each of indicators in the textbook image 510 by selecting the GUI image 530*a* using the pen 111 or the like included in the input unit 110. In addition, it is possible to draw an underline or the like by touching any position on the textbook image 510 using the pen 111 or the like.

On the other hand, the display 131*b* shows a notebook image 520 and a GUI image 530*b*. The notebook image 520 indicates the contents of a notebook of learning content that is currently being used. The GUI image 530*b* corresponds to the operation to be performed for the notebook image 520. In the illustrated example, the GUI image 530*a* that corresponds to the operations, such as write, delete, color setting, thickness setting, bookmark, page turn, and end of notebook is shown. A learner can perform a predetermined operation corresponding to each of indicators of the notebook image 520 by selecting the GUI image 530*b* using the pen 111 or the like included in the input unit 110. The writing to the notebook image 520 can be performed by touching any position on the notebook image 520 using the pen 111 or the like. In addition, the notebook image 520 may be a workbook format in which a portion to be written is shown, and the notebook image 520 may be a free format in which ruled lines or the like are shown.

(Exemplary Display of Administrator Terminal)

Figure 5:
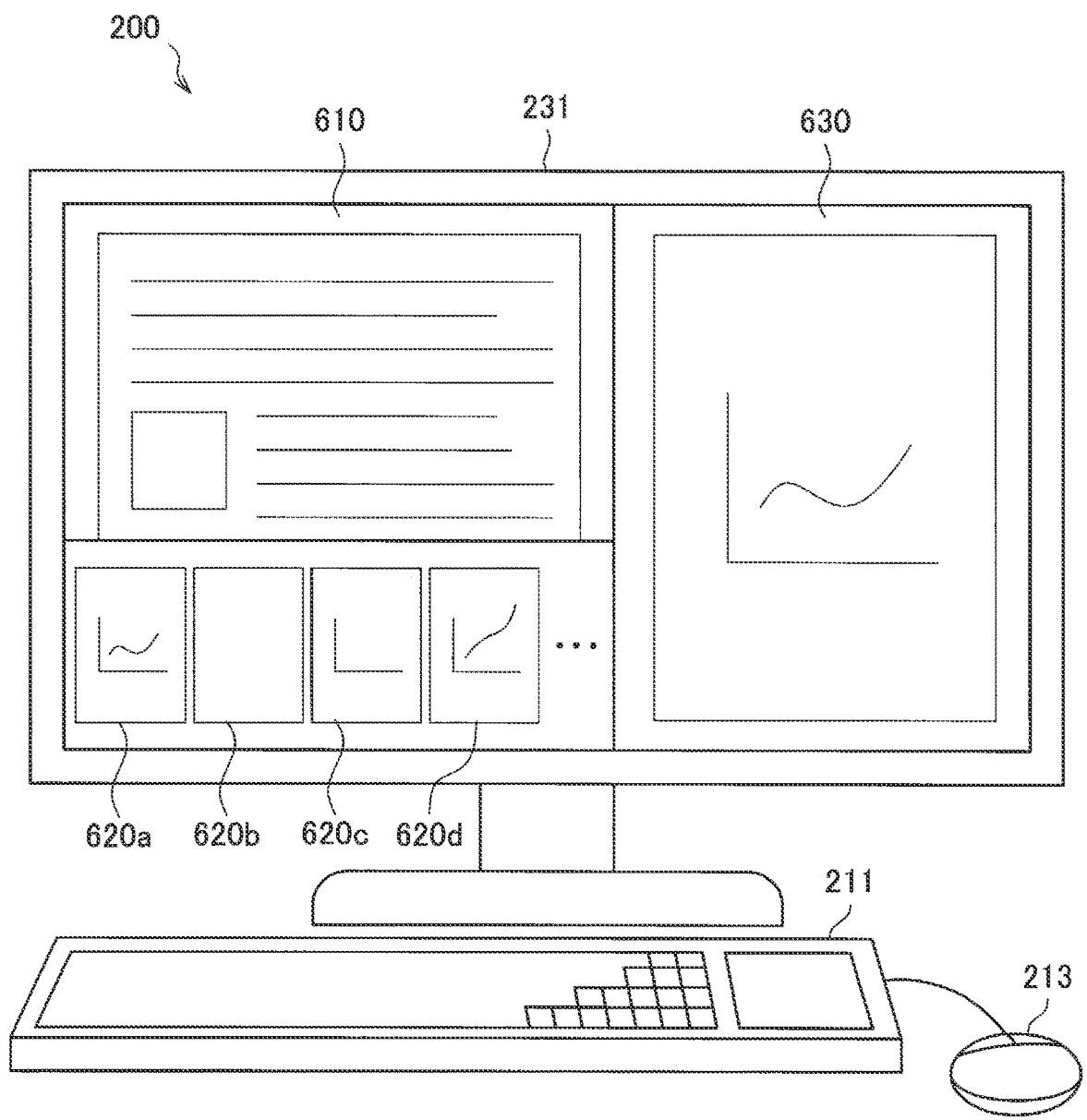
FIG. 5 is a diagram illustrating an example of the display of the administrator terminal according to the first embodiment of the present disclosure.

FIG. 5 is a diagram illustrating an exemplary display of the administrator terminal according to the first embodiment of the present disclosure. In the illustrated example, the administrator terminal 200 includes a display 231 as the output unit 230. The administrator terminal 200 is not limited to a terminal device having a single display.

The display 231 shows a textbook image 610, a notebook list image 620, and a notebook details image 630. The textbook image 610 indicates a textbook image that is currently being shown in the learner terminal 100. The notebook list image 620 shows a reduced notebook image that is currently being shown in the learner terminal 100 for some or all of a plurality of learners. The notebook details image 630 shows an enlarged notebook image that is currently being shown in the learner terminal 100 for any one of the plurality of learners.

An administrator that uses the administrator terminal 200 advances the learning using the textbook image 610. The administrator also checks the learning progress of each learner by the notebook list image 620, and further checks the learning progress for an interested learner by showing the notebook details image 630. Such operations of the administrator may be obtained by the keyboard 211 or the mouse 213 included in the administrator terminal 200 as the input unit 210.

(Functional Configuration of Server Device)

Figure 6:
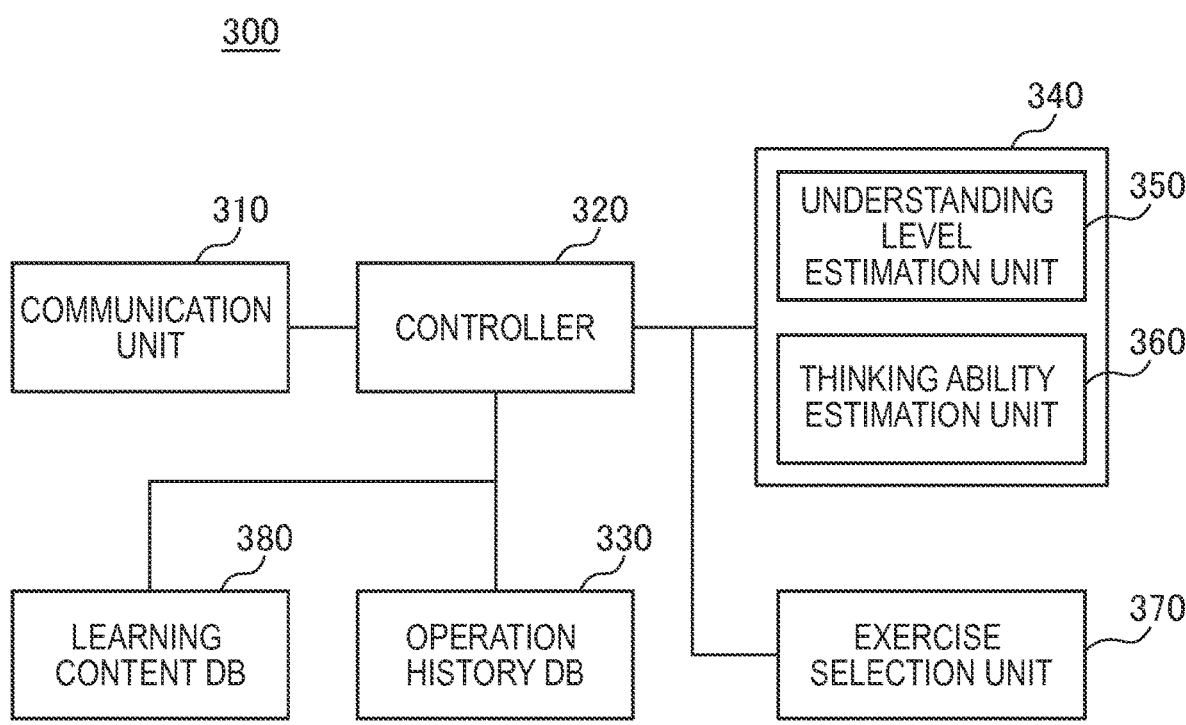
FIG. 6 is a block diagram illustrating a schematic functional configuration of a server according to the first embodiment of the present disclosure.

FIG. 6 is a block diagram illustrating a schematic functional configuration of the server according to the first embodiment of the present disclosure. Referring to FIG. 6, the server 300 includes a communication unit 310, a controller 320, an operation history DB 330, an acceptance ability estimation unit 340, an exercise selection unit 370, and a learning content DB 380. In addition, these functional configurations may be implemented, for example, using a hardware configuration of the information processing device to be described later. For example, the controller 320, the acceptance ability estimation unit 340, and the exercise selection unit 370 may be implemented in software using a CPU, a RAM, a ROM, and so on.

As illustrated in the example of FIG. 1, the server 300 is implemented by a combination of the analysis server 300a and the data server 300b. In this case, the acceptance ability estimation unit 340 and the exercise selection unit 370 may be included in the analysis server 300a. The operation history DB 330 and the learning content DB 380 may be included in the data server 300b. The communication unit 310 and the controller 320 may be included in both of the analysis server 300a and data server 300b.

The communication unit 310 is implemented using a communication device, and transmits and receives data between the learner terminal 100 and the administrator terminal 200. For example, the communication unit 310 receives information relevant to input operations of a learner and/or administrator obtained from the learner terminal 100 and/or administrator terminal 200. In addition, the communication unit 310 may be configured to transmit information of results obtained by the estimation performed in the acceptance ability estimation unit 340 or information of results obtained by the selection performed in the exercise selection unit 370 to the administrator terminal 200 or the learner terminal 100.

The controller 320 is configured to control each component of the server 300. For example, the controller 320 stores information relevant to an input operation of the learner or administrator which is received by the communication unit 310 in the operation history DB 330. In addition, the controller 320 reads out operation history information from the operation history DB 330 and provides it to the acceptance ability estimation unit 340. Furthermore, the controller 320 may provide results obtained by the estimation performed in the acceptance ability estimation unit 340 to the exercise selection unit 370. Moreover, the controller 320 reads out learning content from the learning content DB 380 and provides it to the learner terminal 100 or the administrator terminal 200 through the communication unit 310, as necessary.

The operation history DB 330 is stored with the operation history information received from the learner terminal 100 and the administrator terminal 200. The operation history information may be information obtained by associating information relevant to an input operation inputted by a learner or administrator who is a user with the time at which the input operation is obtained. The input operation information is obtained by each of the learner terminal 100 and the administrator terminal 200. The operation history DB 330 accumulates the operation history information and provides it to the acceptance ability estimation unit 340, as necessary.

The acceptance ability estimation unit 340 is configured to estimate the acceptance ability of a learner for learning content. The learner may be a user of the learner terminal 100. In this embodiment, the acceptance ability estimation unit 340 includes an understanding level estimation unit 350 and a thinking ability estimation unit 360. In another embodiment, the acceptance ability estimation unit 340 may include any one of the understanding level estimation unit 350 and the thinking ability estimation unit 360. The information of acceptance ability that is estimated by the acceptance ability estimation unit 340 is provided, for example, to the administrator terminal 200 or the learner terminal 100. The meaning of the terms "learning content" and "acceptance ability" used herein will be explained below.

The "learning content" refers to content that is used by a learner in the learning system 10. The learning content may include, for example, lesson content, exercise content, test content, and so on. The lesson content uses textbooks and notebooks, and the exercise content uses exercises. The learning content is set in units such as a subject (e.g., language, arithmetic, science, society) or a unit of a subject (e.g., addition, subtraction, multiplication and division of arithmetic). The acceptance ability of a learner to be described later may be estimated, for example, for each of the units. In the particular embodiment, this learning content is stored in the learning content DB 380.

The "acceptance ability" is a property that is showed by a learner who learning learning content. An example of the acceptance ability is the level of understanding which is estimated by the understanding level estimation unit 350. The understanding level is an indicator showing how much a learner understood the learning content. The understanding of the learning content may be defined in various ways depending on the subject or unit described above. For example, in the case of language, it may be an example where a learner can learn vocabulary or grammar and read or write using the learned vocabulary or grammar. On the other hand, in the case of arithmetic, it may be an example where a learner can learn theorems or formulas and calculate using the learned theorems or formulas. Furthermore, in the case of science or society, it may be example where knowledge is memorized properly.

Moreover, another example of the acceptance ability is thinking ability which is estimated by the thinking ability estimation unit 360. The thinking ability is a property when a learner thinks about learning content. For example, the thinking ability is classified into several types, such as a "careless type" (type which makes many careless mistakes), a "trial and error type" (type which tries various ways), a skillful type (type which leads to correct answer skillfully), a consideration type (type which copes with one way over time), and so on.

The "acceptance ability" described above is estimated by the acceptance ability estimation unit 340 based on the history of input operations of a learner who uses the learning content obtained from the operation history DB 330. That is, the "acceptance ability" which is estimated by the acceptance ability estimation unit 340 indicates how the learner has accepted learning content. The "acceptance ability" may be, for example, a more comprehensive concept than the achievement degree of the learning which is measured by a simple test.

The exercise selection unit 370 is provided as an additional element. The exercise selection unit 370 selects an appropriate exercise for a learner who is a user of the learner terminal 100 based on the acceptance ability of the learner for learning content which is estimated by the acceptance ability estimation unit 340. An exercise being selected can be personalized for each learner. In addition, a detailed example of an exercise which is selected based on the acceptance ability will be described later.

(1-3. Process Flow)

(Overall Process Flow)

Figure 7:
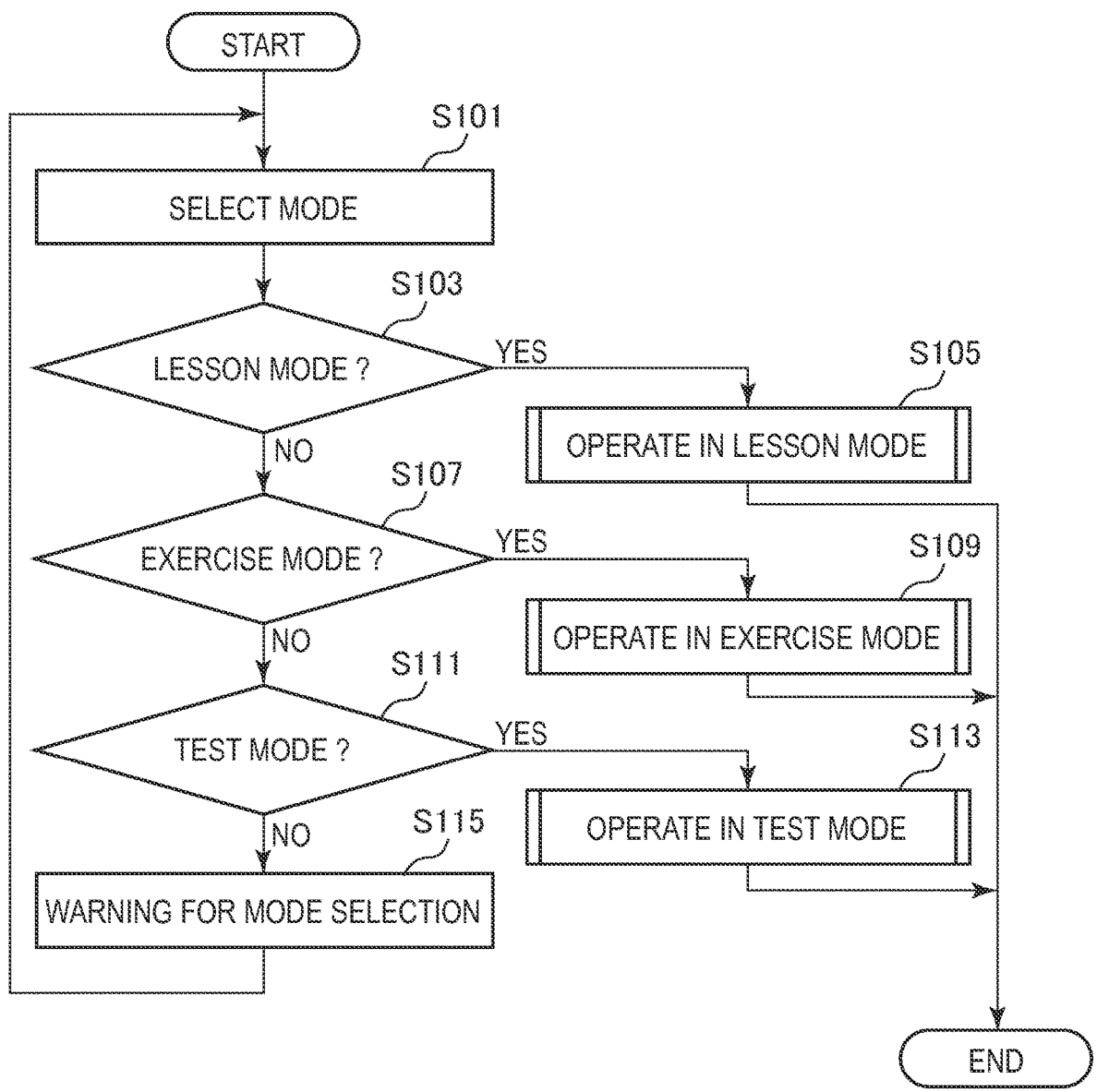
FIG. 7 is a flowchart illustrating an example of the overall process in the first embodiment of the present disclosure.

FIG. 7 is a flowchart illustrating an example of the overall process in the first embodiment of the present disclosure. As illustrated, in the present embodiment, three types of mode are set as an operational mode of the learning system 10, including a lesson mode, an exercise mode, and a test mode. As a process flow, the administrator terminal 200 obtains the operation of an administrator who selects an operational mode (step S101). This may be an initial process that is performed using the administrator terminal 200, for example, when a lesson, an exercise, or a test is started.

Next, the administrator terminal 200 determines whether a mode selected by an administrator is the lesson mode (step S103). If it is determined that the lesson mode is selected, then the administrator terminal 200 notifies the selected mode to the server 300 and the learner terminal 100, and then the learning system 10 operates in the lesson mode (step S105). In this case, the lesson mode is a mode to be selected when a learner (e.g., a student) reads a textbook or solves an exercise on a workbook or the like according to an instruction of an administrator (e.g., a teacher). In addition, an operation of the learning system 10 that is performed in the lesson mode will be described later.

On the other hand, in step S103, if it is determined that the lesson mode is not selected, then the administrator terminal 200 determines whether a mode selected by the administrator is the exercise mode (step S107). If it is determined that the exercise mode is selected, then the administrator terminal 200 notifies the selected mode to the server 300 and the learner terminal 100, and then the learning system 10 operates in the exercise mode (step S109). In this case, the exercise mode is a mode to be selected when a learner (e.g., a student) solves an exercise without an instruction of an administrator (e.g., a teacher). In addition, an operation of the learning system 10 that is performed in the exercise mode will be described later.

On the other hand, in step S107, if it is determined that the exercise mode is not selected, then the administrator terminal 200 determines whether a mode selected by an administrator is the test mode (step S111). If it is determined that the test mode is selected, then the administrator terminal 200 notifies the selected mode to the server 300 and the learner terminal 100, and then the learning system 10 operates in the test mode (step S113). In this case, the test mode is a mode to be selected when a question is presented to a learner (e.g., a student) by an instruction of an administrator (e.g., a teacher) to start solving the question and then the learner answers the question until an instruction of the administrator to stop solving the problem. In addition, an operation of the learning system 10 that is performed in the test mode will be described later.

On the other hand, in step S111, if it is determined that the test mode is not selected, then the administrator terminal 200 is determined that a mode is not selected properly. In this case, the administrator terminal 200 displays a warning that a valid mode selection is necessary (step S115). The process is then returned to the mode selection step (step S101).

(Process Flow of Lesson Mode)

Figure 8:
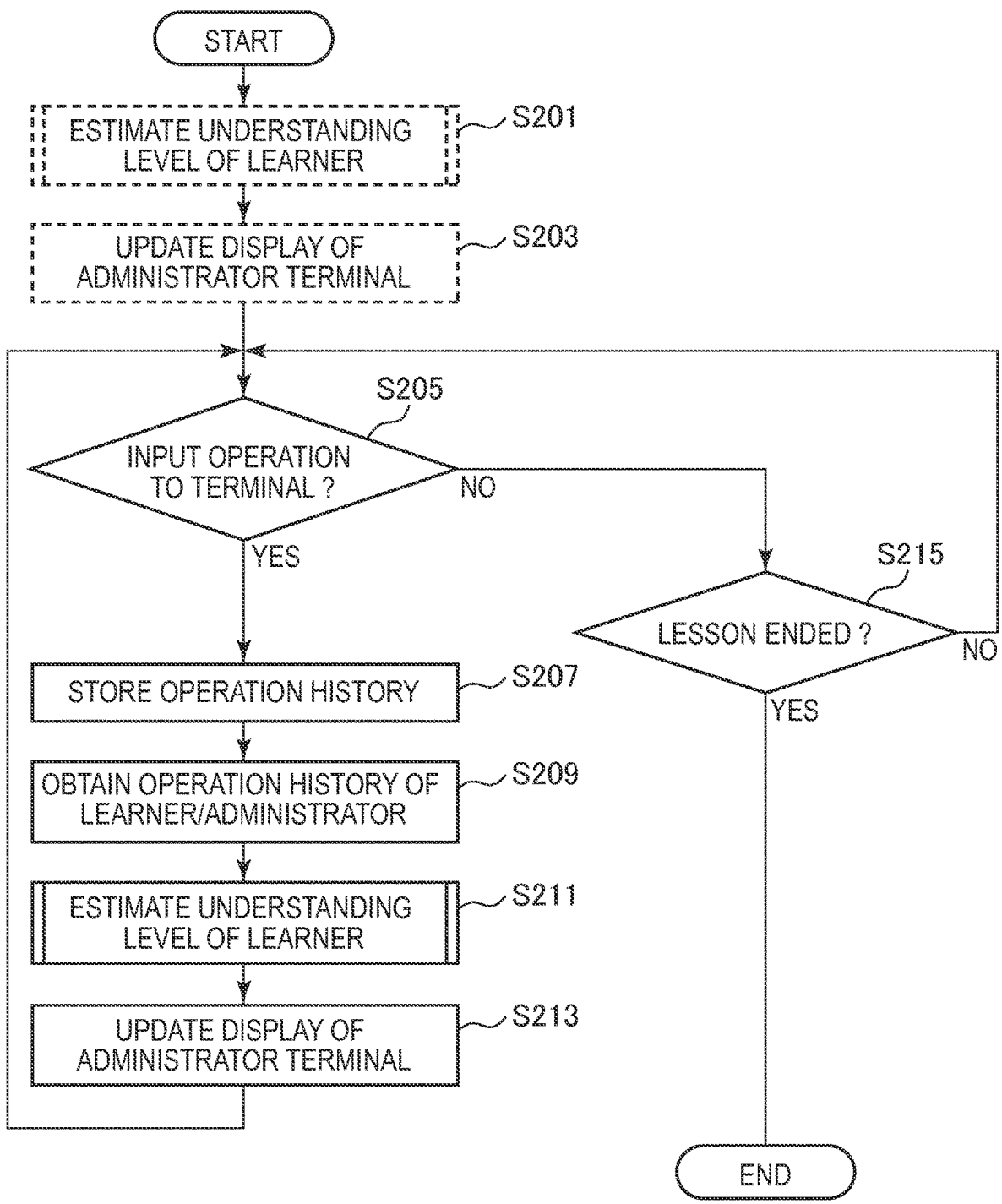
FIG. 8 is a flowchart illustrating an exemplary process of a lesson mode according to the first embodiment of the present disclosure.

FIG. 8 is a flowchart illustrating an exemplary process of the lesson mode according to the first embodiment of the present disclosure. As described above, the lesson mode is a mode to be selected when a learner (e.g., a student) reads a textbook or solves an exercise on a workbook or the like according to an instruction of an administrator (e.g., a teacher).

As an additional configuration, at the start of the lesson, the understanding level estimation unit 350 of the server 300 estimates the understanding level of a learner based on the past operation history of the learner (step S201). In addition, a detailed explanation of the process of estimating the understanding level of a learner will be described later. In this case, the understanding level to be estimated may be a degree of understanding a learner has achieved until now for a subject to be learned in the present lesson. Furthermore, the understanding level to be estimated may be a degree of understanding of the learner with regard to the unit that have been learned in the past relevant to a unit to be learned in the present lesson (e.g., such as multiplication in the case of division in arithmetic). The understanding level to be estimated also may be a degree of understanding of the learner with regard to a unit to be learned in this time that is estimated from the level of understanding of the related unit.

Next, as an additional configuration followed by step S201, the server 300 transmits information that indicates the understanding level of a learner to the administrator terminal 200, and accordingly the display of the administrator terminal 200 is updated (step S203). For example, the understanding level of each learner may be directly displayed by the administrator terminal 200. In addition, a list of learners, the notebook list image 620 described in the example of FIG. 5, or the like may be sorted and displayed by the administrator terminal 200 according to the understanding level of each learner.

With such a display, for example, an administrator can grasp beforehand a learner who is likely to have an insufficient understanding level for contents of the present lesson, and can advance the lesson with particular attention to the learner.

After the start of the lesson, the controller 320 of the server 300 determines whether an input operation of a learner is obtained in the learner terminal 100 (step S205). As described above, information of the obtained input operation is transmitted from the learner terminal 100 to the server 300 in association with the time at which the input operation is obtained. In this case, if an input operation is obtained, then the processes of steps S207 to S213 relevant to the estimation of understanding level are performed based on the input operation history.

On the other hand, if it is determined that an input operation is not obtained in step S205, then the server 300 determines whether an input operation for the end of the lesson is done in the administrator terminal 200 (step S215). In this case, if it is determined that an input operation for the end of the lesson is done, then the series of processes are terminated. If it is determined that an input operation for the end of the lesson is not done, then the server 300 determines again whether an input operation of a learner is obtained (step S205).

As the process relevant to the estimation of understanding level based on the input operation history, the controller 320 of the server 300 first stores operation history information that indicates the input operation received from the learner terminal 100 in the operation history DB 330 (step S207). As described above, the operation history information provided from the learner terminal 100 is information that is obtained by associating an input operation of a learner to the learner terminal 100 with the time at which the input operation is obtained. Thus, the operation history DB 330 is stored with a series of operation history for each learner in association with each corresponding time.

Next, the controller 320 obtains the operation history of a learner from the operation history DB 330 and provides it to the understanding level estimation unit 350 (step S209). The controller 320 may further obtain the operation history of the learner which is similarly obtained by the administrator terminal 200, transmitted to server 300 and stored in the operation history DB 330, and may provide the obtained operation history to the understanding level estimation unit 350. In this case, the operation history provided to the understanding level estimation unit 350 is not limited to the operation history stored in the above-described step S207. That is, the operation history which has been obtained in the past, the operation history of other learners, or the like may be provided as necessary to estimate the understanding level in the understanding level estimation unit 350.

Subsequently, the understanding level estimation unit 350 estimates the understanding level of a learner (step S211). In this case, the understanding level to be estimated may be a degree of understanding of a learner with regard to a unit to be learned in the present lesson, that is, a real-time understanding level of the learner for the lesson. In addition, a detailed explanation of the process of estimating the understanding level of a learner will be described later.

Next, the server 300 transmits information that indicates the understanding level of a learner to the administrator terminal 200, and accordingly the display of the administrator terminal 200 is updated (step S213). For example, the understanding level of each learner may be directly displayed by the administrator terminal 200. In addition, a list of learners, the notebook list image 620 described in the example of FIG. 5, or the like may be sorted and displayed by the administrator terminal 200 according to the understanding level of each learner.

With such a display, for example, an administrator can grasp an understanding level of each learner for contents of the lesson in real time, and advance the lesson with particular attention to a learner having a relatively low understanding level. In addition, the administrator can also grasp in real time understanding levels of all the learners and can adjust the pace of lesson accordingly.

(Process Flow of Exercise Mode)

Figure 9:
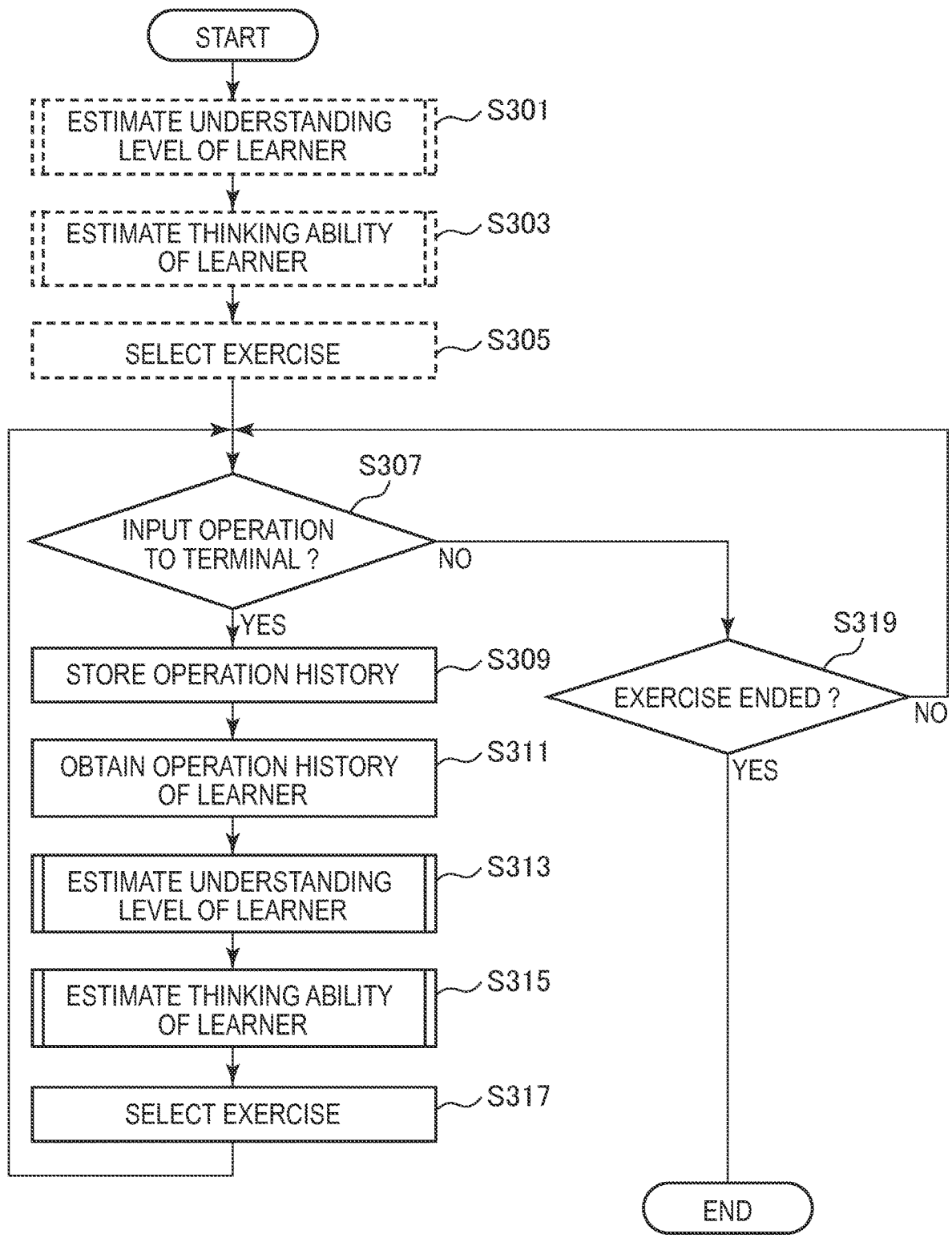
FIG. 9 is a flowchart illustrating an exemplary process of an exercise mode according to the first embodiment of the present disclosure.

FIG. 9 is a flowchart illustrating an exemplary process of the exercise mode according to the first embodiment of the present disclosure. As described above, the exercise mode is a mode that is selected when a learner (e.g., a student) solves an exercise without an instruction of an administrator (e.g., a teacher).

As an additional configuration, at the start of the exercise, the understanding level estimation unit 350 of the server 300 estimates the understanding level of a learner based on the past operation history of the learner (step S301). In addition, a detailed explanation of the process of estimating the understanding level of a learner will be described later. In this case, the understanding level to be estimated may be a degree of understanding in which a learner has achieved until now for a subject presented in the exercise. Furthermore, the understanding level to be estimated may be a degree of understanding of a learner with regard to the unit that have been learned in the past relevant to a unit presented in the exercise. The understanding level to be estimated also may be a degree of understanding of the learner with regard to a unit to be learned that is estimated from the understanding level with regard to the relevant unit.

Next, as an additional configuration, the thinking ability estimation unit 360 of the server 300 estimates a thinking ability of a learner based on the past operation history of the learner (step S303). The thinking ability estimation unit 360 may estimate a thinking ability further based on the understanding level of a learner which is estimated in step S301. In addition, a detailed explanation of the process of estimating the thinking ability of a learner will be described later. In this case, a scope of the thinking ability to be estimated may be set in various ways, similar to the estimation of understanding level in step S301.

Additionally, in the present embodiment, because information of the understanding level can be used to estimate a thinking ability as described later, thus the estimation of thinking ability is performed subsequent to the estimation of understanding level as described above. Alternatively, in another embodiment, the estimation of a thinking ability can be performed without using information of the understanding level to be estimated. In this case, only the estimation of a thinking ability may be performed without estimating the understanding level. In addition, the estimation of the understanding level and thinking ability may be performed in a reverse order, or may be performed in parallel.

Next, as an additional configuration followed by steps S301 and S303, the exercise selection unit 370 of the server 300 selects an exercise according to the estimated understanding level and thinking ability of a learner (step S305). In addition, an example of selecting an exercise according to the understanding level and thinking ability will be described later. In the present embodiment, any one or both of the understanding level and thinking ability of a learner may be estimated. In addition, when both of the understanding level and thinking ability are estimated, the exercise selection unit 370 may be configured to select an exercise according to any one of them.

Thus, for example, it is possible for a learner who is subjected to an exercise to be presented with an appropriate exercise according to the understanding level and thinking ability of the learner and to be answered to the exercise, thereby further increasing the effect of exercise.

After the start of the exercise, the controller 320 of the server 300 determines whether an input operation of a learner is obtained in the learner terminal 100 (step S307). As described above, information of the obtained input operation is transmitted from the learner terminal 100 to the server 300 in association with the time at which the input operation is obtained. In this case, if it is determined that an input operation is obtained, then the processes of steps S309 to S317 which are related to the estimation of an understanding level and thinking ability are performed based on the input operation history.

On the other hand, if it is determined that an input operation is not obtained in step S307, then the server 300 determines whether an input operation for the end of the exercise is done in the administrator terminal 200 (step S319). In this case, if it is determined that an input operation for the end of the exercise is done, then a series of processes are terminated. If it is determined that an input operation for the end of the exercise is not done, then the server 300 determines again whether an input operation of a learner is obtained (step S307).

As a process relevant to the estimation of understanding level based on the input operation history, the controller 320 of the server 300 first stores operation history information that indicates the input operation received from the learner terminal 100 in the operation history DB 330 (step S309). As described above, the operation history information provided from the learner terminal 100 is information obtained by associating an input operation of a learner to the learner terminal 100 with the time at which the input operation is obtained. Thus, the operation history DB 330 may be stored with a series of operation history for each learner in association with each corresponding time.

Next, the controller 320 obtains an operation history of a learner from the operation history DB 330 and provides it to the understanding level estimation unit 350 (step S311). In this case, the operation history provided to the understanding level estimation unit 350 is not limited to the operation history stored in the above-described step S309. That is, the operation history that has been obtained in the past, the operation history of other learners, or the like may be provided as necessary to estimate the understanding level in the understanding level estimation unit 350.

Next, the understanding level estimation unit 350 estimates the understanding level of a learner (step S313). In this case, the understanding level to be estimated may be a level of understanding of a learner with regard to a unit presented in the current exercise, that is, a real-time understanding level of the learner with regard to the exercise. A detailed explanation of the process of estimating the understanding level of a learner will be described later.

Next, the thinking ability estimation unit 360 estimates the thinking ability of a learner (step S315). In this case, the thinking ability to be estimated may be thinking ability of the learner with regard to a question of a unit presented in the current exercise, that is, a real-time thinking ability of the learner with regard to the exercise. A detailed explanation of the process of estimating the thinking ability of a learner will be described later.

Additionally, in the present embodiment, because information of the understanding level can be used to estimate a thinking ability as described later, thus the estimation of thinking ability is performed subsequent to the estimation of understanding level as described above. Alternatively, in another embodiment, the estimation of thinking ability can be performed without using information of the understanding level to be estimated. In this case, only the estimation of thinking ability may be performed without estimating the understanding level. In addition, the estimation of the understanding level and thinking ability may be performed in a reverse order, or may be performed in parallel.

Next, the exercise selection unit 370 selects an exercise according to the estimated understanding level and thinking ability of a learner (step S317). In addition, an example of selecting an exercise according to the understanding level and thinking ability will be described later. In the present embodiment, any one or both of the understanding level and thinking ability of a learner may be estimated. In addition, when both of the understanding level and thinking ability are estimated, the exercise selection unit 370 may select an exercise according to any one of both.

Thus, for example, it is possible for a learner who is subjected to an exercise to be presented with an appropriate exercise according to the understanding level and thinking ability and to be answered to the exercise, thereby further increasing the effect of exercise.

(Process Flow of Test Mode)

Figure 10:
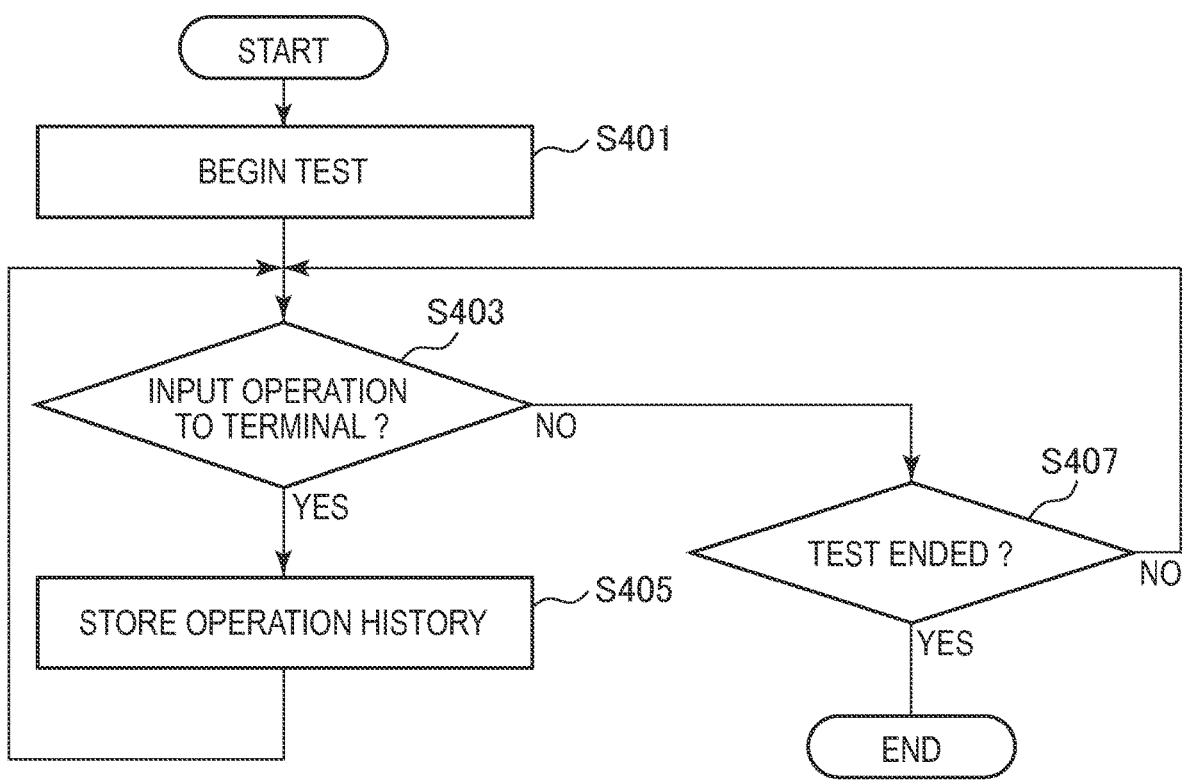
FIG. 10 is a flowchart illustrating an exemplary process of a test mode according to the first embodiment of the present disclosure.

FIG. 10 is a flowchart illustrating an exemplary process of the test mode according to the first embodiment of the present disclosure. As described above, the test mode is a mode that is selected when a question is presented to a learner (e.g., a student) by the instruction of an administrator (e.g., a teacher) to start solving the problem and then the learner answers the question until the instruction of the administrator to stop solving the question.

The administrator terminal 200 first obtains an instruction of an administrator which indicates the start of test (step S401), and then a series of processes are started. After the start of the test, the controller 320 of the server 300 determines whether an input operation of a learner is obtained in the learner terminal 100 (step S403). As described above, information of the obtained input operation is transmitted from the learner terminal 100 to the server 300 in association with the time at which the input operation is obtained.

In this case, if it is determined that an input operation is obtained, the controller 320 of the server 300 stores operation history information that indicates the input operation received from the learner terminal 100 in the operation history DB 330 (step S405). As described above, the operation history information provided from the learner terminal 100 is information obtained by associating an input operation of a learner to the learner terminal 100 with the time at which the input operation is obtained. Thus, the operation history DB 330 may be stored with a series of operation history for each learner in association with each corresponding time.

Additionally, in the test mode, the estimation of the understanding level and thinking ability is not performed. According to the present embodiment, this is, in the test mode, because the learner may only answer the question that has been predetermined by a learner and there is no room for any intervention from the administrator or for any selection of questions. In another embodiment, the understanding level or thinking ability may be estimated, and the estimated understanding level or thinking ability may be provided to the administrator, for example, through the administrator terminal 200. In addition, the stored operation history information may be used to estimate the understanding level or thinking ability in the lesson or exercise to be performed in the future.

On the other hand, if it is determined that an input operation is not obtained in step S403, then the server 300 determines whether an input operation for the end of the test is done in the administrator terminal 200 (step S407). In this case, if it is determined that an input operation for the end of the test is done, then the series of processes are terminated. If it is determined that an input operation for the end of the test is not done, then the server 300 determines again whether an input operation of a learner is obtained (step S403).

(1-4. Estimation of Understanding Level)

Subsequently, a process of estimating an understanding level according to the first embodiment of the present disclosure will be described. As described above, in this embodiment, the understanding level estimation unit 350 of the server 300 estimates an understanding level of a learner for a lesson content based on the history of an input operation of the learner who is using the lesson content.

(Operation History)

In the present embodiment, the history of input operation of a learner which is used to estimate an understanding level will now be described. The input operation of a learner which is obtained in the learner terminal 100 may, for example, includes the following types:

Page Operation (turn over page, save page, etc.)

Drawing Operation (straight line, circle, freehand, handwritten character, marker, selection of color, selection of line type, selection of filling color, selection of filling pattern, drawing positioning, etc.)

Text Input (input using keyboard, make texts using character recognition function of handwritten character, etc.)

Cancel Operation (erase by eraser function, erase designated block, revert to previous state (undo), etc.)

The input operation as described above is stored in the operation history DB 330 as an operation history in association with the time at which the input operations are obtained. The understanding level estimation unit 350 obtains the operation history as necessary, and uses the obtained operation history to estimate the understanding level of a learner. In addition, the understanding level estimation unit 350 may also use the operation history of an administrator which is similarly obtained by the administrator terminal 200 and is stored in the operation history DB 330.

(Example of Estimation Algorithm)

A necessary time period taken for a certain learner to perform a certain work (e.g., a series of operations which are instructed by the administrator, an answer to a question, etc.) during the lesson, exercise, or test is assumed to be x. if an average of the time period taken for the entire learner including other learners to perform the work is assumed to be X, then a relative value Rx in the total necessary time period for the learner can be expressed as $Rx=(x-X)/X$.

Next, the number of cancel operations that the learner described above has performed during a certain work is assumed to be c. If an average of the number of cancel operations that the entire learners including other learners have performed during the work is assumed to be C, then a relative value Rc in the total number of cancel operations that the learner has performed can be expressed as $Rc=(c-C)/C$.

In this case, as an example of a first method of estimating an understanding level (a method based on given rules), the understanding level can be determined in three stages by defining the rules described below. In this method, a threshold of a relative necessary time period when determined to be a high understanding level is assumed to be Thx, a threshold of the number of relative cancel operations when determined to be a high understanding level is assumed to be Thc, a threshold of a relative necessary time period when determined to be a low understanding level is assumed to be Tlx, and a threshold of the number of relative cancel operations when determined to be a low understanding level is assumed to be Tlc.

(1) If (Thx>Rx) and (Thc>Rc), then it is determined to be a high understanding level (2) If (Tlx<Rx) and (Tlc<Rc), then it is determined to be a low understanding level (3) Otherwise, it is determined to be a common understanding level On the other hand, as an example of a second method of estimating an understanding level (a statistical method), a technique called multiple regression analysis is used. In this case, as an indicator of understanding level, a value in which test scores of a certain unit is normalized to 0 to 1 is assumed to be S. A set of the above relative necessary time period Rx, the number of relative cancel operations Rc, and the value of S is collected for a learner who has learned the same unit in the past. Based on data obtained by this, if the multiple regression analysis is performed by assuming Rx and Rc to be explanatory variables and S to be an objective variable, then a regression equation is given as follows. If such a regression equation is used, Rx and Rc of the learner are obtained from the operation history, and then the understanding level S can be estimated using these values.

$$S=a*Rx+b*Rc$$

For example, when the operation history corresponding to the answer to a question in an exercise mode or the like is obtained, this estimation of understanding level may be performed by calculating and comparing an operation necessary time period or the number of cancel operations for each question. In addition, when the operation history of input operation corresponding to an instruction of an administrator in a lesson mode or the like is obtained, the estimation of understanding level may be performed by calculating and comparing an operation necessary time period or the number of cancel operations for each input operation corresponding to the instruction. In addition, the instruction of an administrator may be specified by obtaining an input operation relevant to the instruction of an administrator in the administrator terminal 200 along with the corresponding time.

(Example of Process Flow)

Figure 11:
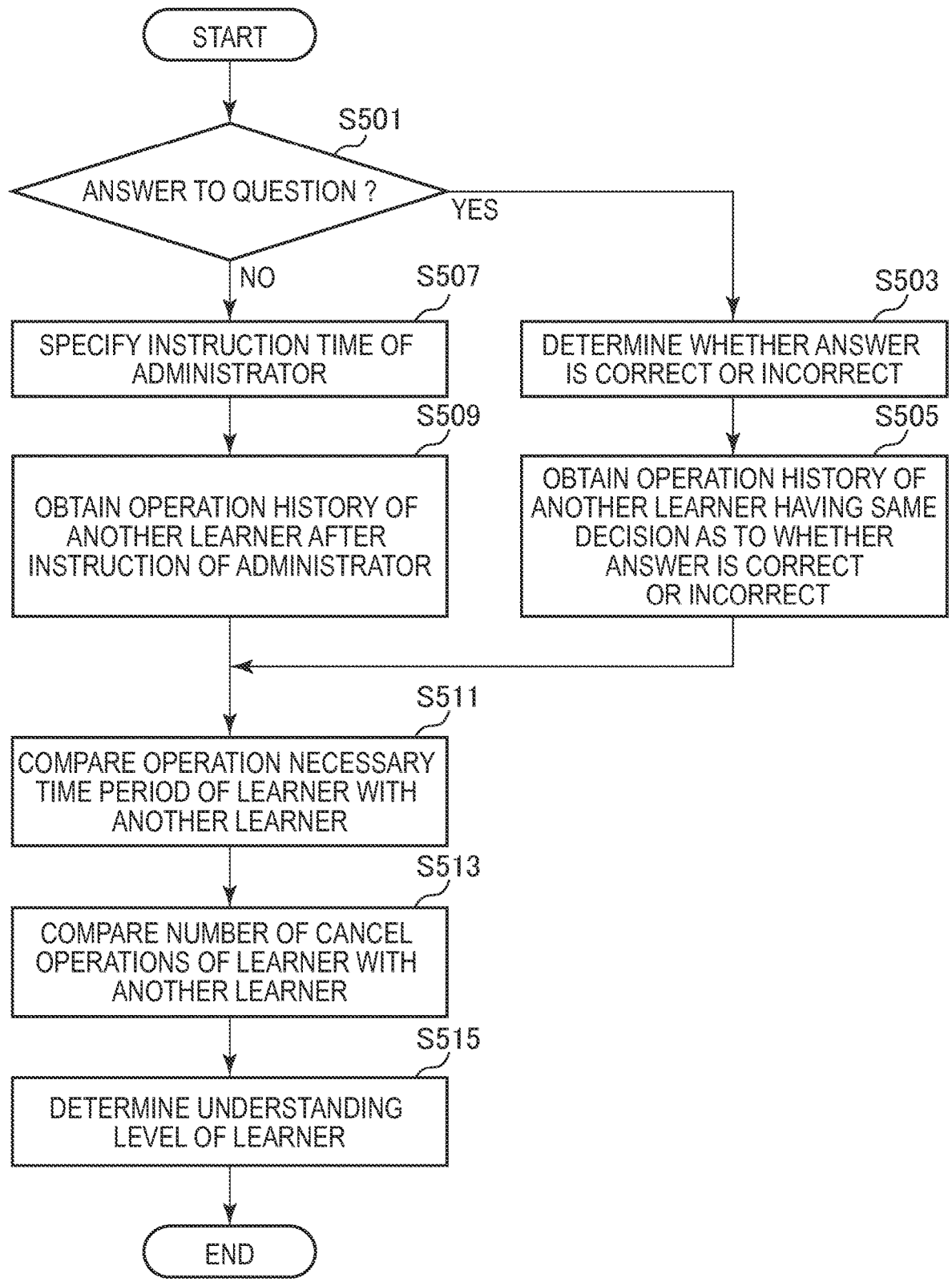
FIG. 11 is a flowchart illustrating a process of estimating an understanding level according to the first embodiment of the present disclosure.

FIG. 11 is a flowchart illustrating a process of estimating the understanding level according to the first embodiment of the present disclosure. The estimation process described below may be performed sequentially on a series of process history of a learner which is stored in the process history DB 330, or may be performed on the input operation of a learner which is newly obtained with reference to the past process history as necessary.

The understanding level estimation unit 350 determines whether the operation history of a learner to be processed is an operation history related to an answer to a question (step S501). The operation history related to an answer to a question may be obtained, for example, when there is an answer to an exercise that is incorporated in a workbook or the like also in the lesson mode, in addition to the exercise mode or test mode. The operation history other than those related to the answer to a question may include, for example, an operation history when opening a textbook or writing on a notebook according to an instruction of an administrator in the lesson mode.

In the above step S501, if it is determined that the operation history is related to an answer to a question, then the understanding level estimation unit 350 determines whether the answer is correct or incorrect (step S503). Next, the understanding level estimation unit 350 obtains the operation history related to the answer of other learners having the same decision as to whether the answer is correct or incorrect from the operation history DB 330 through the controller 320 (step S505). In the present embodiment, in a case where it is determined that the operation history is related to an answer to a question, if the answer of a learner is correct, the above-mentioned relative necessary time period Rx or the number of relative cancel operations Rc is calculated by comparing it with operation history of other learners who have entered the same correct answer. In addition, the operation history obtained by this may be an operation history ranging from the beginning to the end of the answer to a question. In other words, the operation necessary time period or the number of relative cancel operations is calculated for each question.

Thus, for example when a learner has entered the correct answer in an exercise or test, it is possible to estimate the understanding level with removing the influence of other learners who have entered the wrong answer because of giving up the answer, thereby improving the accuracy of the estimation of understanding level using a relative value. In addition, for example, on the assumption that the entire learners answer the question in the same way, including an answer to an exercise during the lesson, the operation history of the entire learners may be obtained regardless of whether the answer is correct or incorrect. Alternatively, the understanding level estimation unit 350 may use the correctness of the answer as one of parameters for estimating an understanding level in a similar way to the operation necessary time period or the number of relative cancel operations.

On the other hand, in step S501, if it is determined that the operation history is not related to the answer to a question, then the understanding level estimation unit 350 specifies the instruction time of an administrator (step S507). In this case, the instruction of an administration whose time is specified is an instruction related to the operation history of a learner to be processed. For example, when the operation history of a learner is an operation history relevant to marking on a textbook, the operation history of an administrator to instruct the learner to mark on the textbook is obtained, and the instruction time is specified from the time associated with the operation history. In addition, the operation history of an administrator may be obtained, for example, by selecting a menu with a pen included in the input unit 210 of the administrator terminal 200, or by obtaining an instruction voice with a microphone and analyzing contents of the instruction.

Subsequent to step S507, the understanding level estimation unit 350 obtains operation history of other learners after the instruction time of an administrator from the operation history DB 330 (step S509). With this, the administrator can calculate an elapsed time until each learner initiate an operation input in response to the instruction of the administrator after the administrator issues the instruction. In addition, the number of cancel operations can be obtained for an operation input of each learner corresponding to the instruction of the administrator.

Next, the understanding level estimation unit 350 compares the operation necessary time period of a learner with those of other learners (step S511). A process to be performed in this case may be, for example, a process for calculating the above-mentioned relative necessary time period Rx. In addition, the understanding level estimation unit 350 compares the number of cancel operations with that of other learners (step S513). The understanding level estimation unit 350 determines the understanding level of a learner based on results obtained from these comparisons (step S515). In steps S511 to S515, for example, as described above, the process of the estimation of understanding level can be performed based on given rules or using a statistical method.

The understanding level of each learner, which is estimated as described above, may be an indicator that represents more comprehensively the acceptance ability for learning content, compared to an indicator that represents the correctness of the answer to a question as points. For example, in the present embodiment, even if a learner has entered the correct answer to a question, the understanding level is estimated by comparing the operation necessary time period or the number of cancels between learners who have entered the same correct answer. Therefore, it is possible to express in more detail how much a learner understood the learning content.

Furthermore, in the present embodiment, the understanding level may be estimated using the operation necessary time period or the number of cancel operations not only when a learner answers a question but also when the learner performs some operations for the instruction of an administrator during the lesson or the like. Thus, the understanding level of a learner can be estimated by not only the answer to a question during the lesson or test as the result of the learning but also the behavior during the lesson in the course of the learning. With this, for example, it is possible for an administrator to deal with individually according to the understanding level of a learner during the lesson in real time, or to see through the characteristics of the learner who has understood during the lesson but not solved the question.

(1-5. Estimation of Thinking Ability)

Subsequently, a process of estimating a thinking ability according to the first embodiment of the present disclosure will be described. As described above, in the present embodiment, the thinking ability estimation unit 360 of the server 300 estimates a thinking ability for the learning content of a learner based on the input operation history of the learner during the use of learning content.

Figure 12:
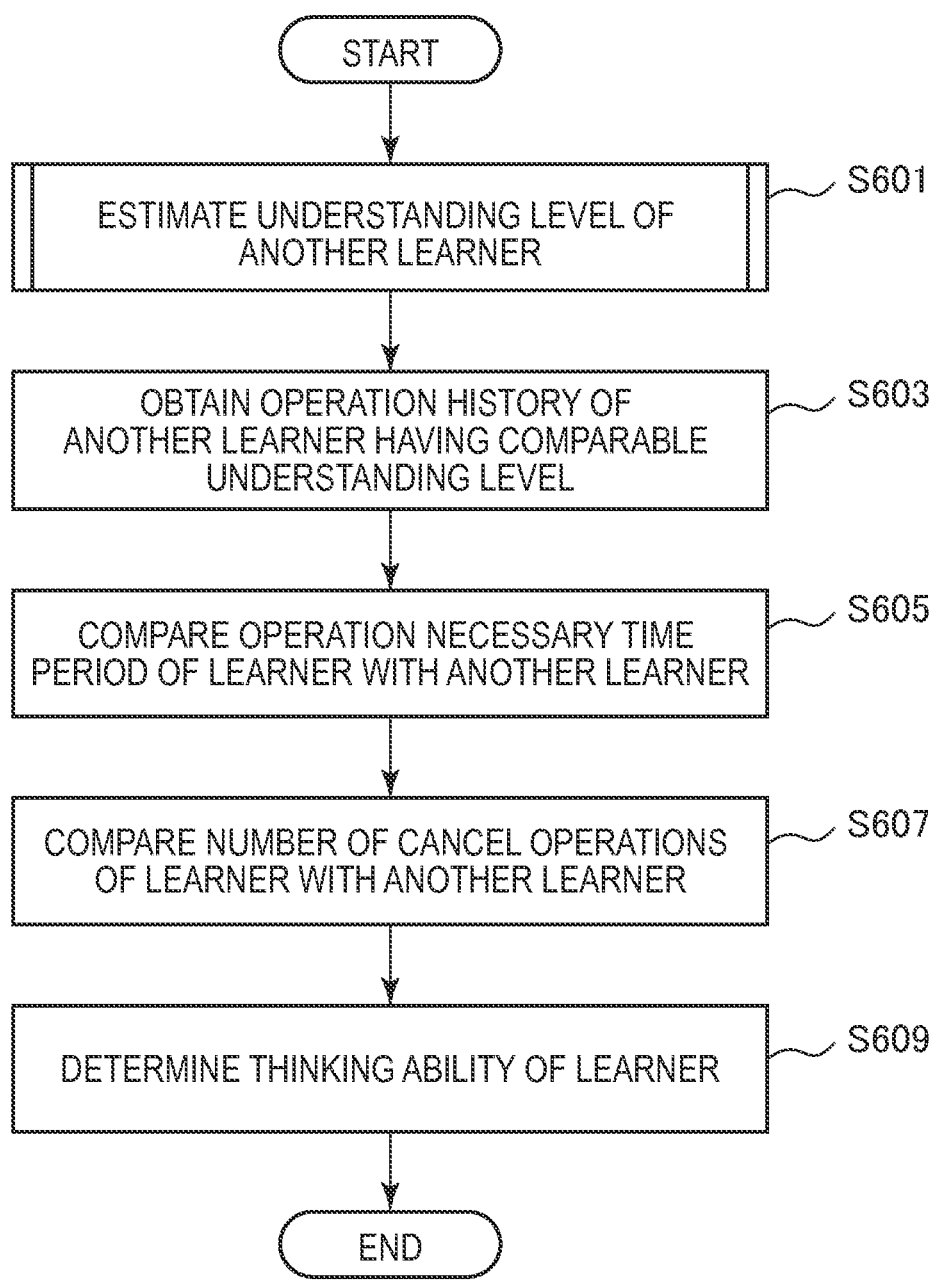
FIG. 12 is a flowchart illustrating a process of estimating a thinking ability according to the first embodiment of the present disclosure.

FIG. 12 is a flowchart illustrating a process of estimating a thinking ability according to the first embodiment of the present disclosure. The estimation process to be described below may be performed, for example, sequentially on a series of process history of a learner which is stored in the process history DB 330, or may be performed on the input operation of a learner which is newly obtained with reference to the past process history as necessary.

The thinking ability estimation unit 360 estimates the understanding level of other learners for learning content (step S601). In the present embodiment, because the process of estimating a thinking ability is performed (step S315), for example, followed by the estimation of understanding level of a learner in the exercise mode shown in FIG. 9 (step S313), it is assumed that the understanding level of a learner to be estimated has been estimated previously. Thus, for example, in another embodiment in which a thinking ability is estimated without estimating an understanding level, each of understanding levels of the entire learners including a learner to be estimated is estimated. A process of estimating other understanding levels is, for example, similar to the process described with reference to FIG. 9.

Next, the thinking ability estimation unit 360 obtains operation history of other learners having a comparable understanding level with the learner to be estimated (step S603). The estimation process of a thinking ability to be described below uses the obtained operation history of other learners having the comparable understanding level. With this, for example, the influence of a high or low understanding level for the operation necessary time period or the number of cancel operations may be removed (the operation necessary time period is short because the understanding level is high; the number of cancel operations is larger because the understanding level is low), thereby improving the accuracy of thinking ability. In addition, for example, when the thinking ability is estimated without estimating the understanding level, the operation history is not necessarily limited to those of other learners having the comparable understanding level. In this case, the operation histories of all of the other learners are obtained.

Next, the thinking ability estimation unit 360 compares the operation necessary time period of a learner with that of another learner (step S605). In addition, the thinking ability estimation unit 360 compares the number of cancel operations with that of another learner (step S607). The thinking ability estimation unit 360 then determines the thinking ability of a learner based on the results obtained from these comparisons (step S609).

By determining the thinking ability in steps S605 to S609, for example, learners are classified into the following types. The length of the operation necessary time period and the frequency of the number of cancel operations may be determined by comparing with an average value of the entire learners including another learner.

(1) Careless type: the operation necessary time period is short, and the number of cancel operations is large (2) Trial and error type: the operation necessary time period is long, and the number of cancel operations is large (3) Skillful type: the operation necessary time period is short, and the number of cancel operations is small (4) Consideration type: the operation necessary time period is long, and the number of cancel operations is small This classification makes it possible to make a classification concisely indicating which process has been performed for a learner to derive the answer to a question. In this way, even when some learners have entered the same correct answer to the question, the distinction between a learner who derives the answer effortlessly and a learner who derives the answer with difficulty is possible. For example, such thinking ability information may be transmitted to the administrator terminal 200 without modification and then may be used to grasp the state of the learner by the administrator. In addition, the thinking ability information may be provided to the exercise selection unit 370 to be described later and may be used to personalize for each learner of the exercise.

(1-6. Selection of Exercise)

Subsequently, a process of the selection of exercise according to the first embodiment of the present disclosure will be described. In the present embodiment, as an additional configuration, for example in the exercise mode, the exercise selection unit 370 of the server 300 selects an appropriate exercise according to the estimated understanding level or thinking ability of the learner. In the following, there will be described an example of what kind of question is selected according to each of the thinking ability and understanding level, which corresponds to the example of estimating a thinking ability of a learner described above.

(1) Case of the Careless Type with a Low Understanding Level

Select a number of basic questions with a low degree of difficulty, and promote learning skill while securing the amount of exercise.

(2) Case of the Trial and Error Type with a Low Understanding Level

Select a basic question with a low degree of difficulty, and then gradually change into a question with a high degree of difficulty as an operation necessary time period of answer tends to become reduced.

(3) Case of the Skillful Type with a Low Understanding Level

Because it is estimated to be thought and answered appropriately, select a question with a slightly high degree of difficulty and develop the habit of thinking with care.

(4) Case of the Consideration Type with a Low Understanding Level

Because it is estimated that only a processing time is slow, select a number of basic questions with a low degree of difficulty and enhance the speed of answer while securing the amount of exercise.

(5) Case of the Careless Type with a High Understanding Level

Select a slightly greater number of questions with a moderate degree of difficulty and improve the accuracy of answer while securing the amount of exercise.

(6) Case of the Trial and Error Type with a High Understanding Level

Because it is estimated to be difficult to set up the whole prospect at the beginning of answer, select mainly an applied exercise that combines multiple procedures or knowledge, not selecting a question of a basic procedure or knowledge.

(7) Case of the Skillful Type with a High Understanding Level

Mix and set questions with a moderate to high degree of difficulty, and allow a learner to challenge a question with a high degree of difficulty while considering the learner not to lose confidence.

(8) Case of the Consideration Type with a High Understanding Level

Select carefully applied questions with a high degree of difficulty, and enhance the thinking and application.

In general, in order to maintain the motivation of a learner, it is effective to challenge some questions with a higher degree of difficulty than the ability. On the other hand, if the level of a question is too high, the learner is likely to lose confidence and thus the learner's motivation may be lowered. In consideration of this, the above-mentioned example is an example for selecting the type of questions which are set based on understanding level and thinking ability. Further, there may be a method for selecting questions according to understanding level or thinking ability, and thus an exercise may be selected using this method. Moreover, as described above, in another embodiment, it is possible to estimate only one of the understanding level and thinking ability. In this case, the exercise may be selected based on any one of the understanding level and thinking ability. Further, even when both of the understanding level and thinking ability are selected, the exercise may be selected based on only one of them.

In accordance with the first embodiment of the present disclosure described above, for example, it is possible for an administrator to coach carefully the learner's study during the lesson by estimating the acceptance ability of the understanding level or thinking ability of the learner for learning content. Furthermore, it is possible to optimize the question to be given during the exercise by considering even the trend of the learner in the process of answering.

2. Second Embodiment

Next, a second embodiment of the present disclosure will be described with reference to FIG. 13 and FIG. 14. The second embodiment is similar to the first embodiment in that the second embodiment obtains the operation history and estimates the acceptance ability based on the obtained operation history. The second embodiment is different from the first embodiment in that the second embodiment performs the estimation process by the administrator terminal. Thus, in the following, the difference will be mainly described.

Figure 13:
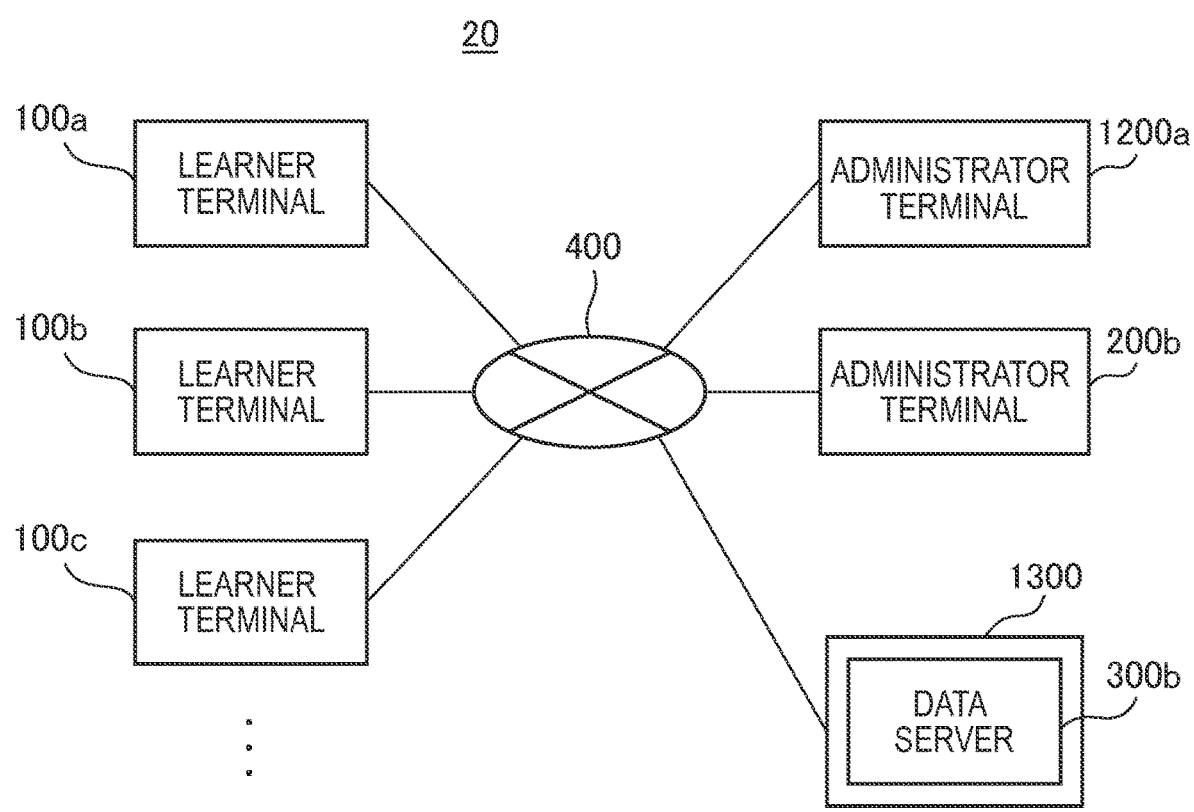
FIG. 13 is a schematic diagram illustrating a configuration of a learning system according to a second embodiment of the present disclosure.

FIG. 13 is a schematic diagram illustrating a configuration of a learning system according to the second embodiment of the present disclosure. Referring to FIG. 13, a learning system 20 includes a learner terminal 100, an administrator terminal 200, 1200, and a server 1300. The learner terminal 100, the administrator terminal 200, 1200 and the server 1300 are connected with each other by various types of wired or wireless networks 400.

The learner terminal 100 according to the second embodiment has a similar configuration to the learner terminal 100 according to the first embodiment, and thus the detailed description thereof is omitted.

The administrator terminal 1200a has a function of the analysis server 300a, in addition to the similar function to the administrator terminal 200 of the first embodiment. The more detailed configuration of the administrator terminal 200 will be described later. The learning system 20 may include an administrator terminal 200b similar to that of the first embodiment, in addition to the administrator terminal 1200a. Additionally, the illustrated example is only an example, and the learning system 20 may include one or more administrator terminals 1200 without including other administrator terminals. Alternatively, the learning system 20 may include one or more administrator terminals 200 in addition to the administrator terminal 1200.

The server 1300 does not include the function of the analysis server 300a among the functions of the server 300 in the first embodiment. Thus, the server 1300 functions only as a data server 300b. The function of the analysis server 300a is implemented by the administrator terminal 1200, as described above.

In the learning system 20, the positions of the learner terminal 100, the administrator terminal 200, 1200 and the server 1300 may be optionally set, which is similar to the learning system 10 in the first embodiment.

Figure 14:
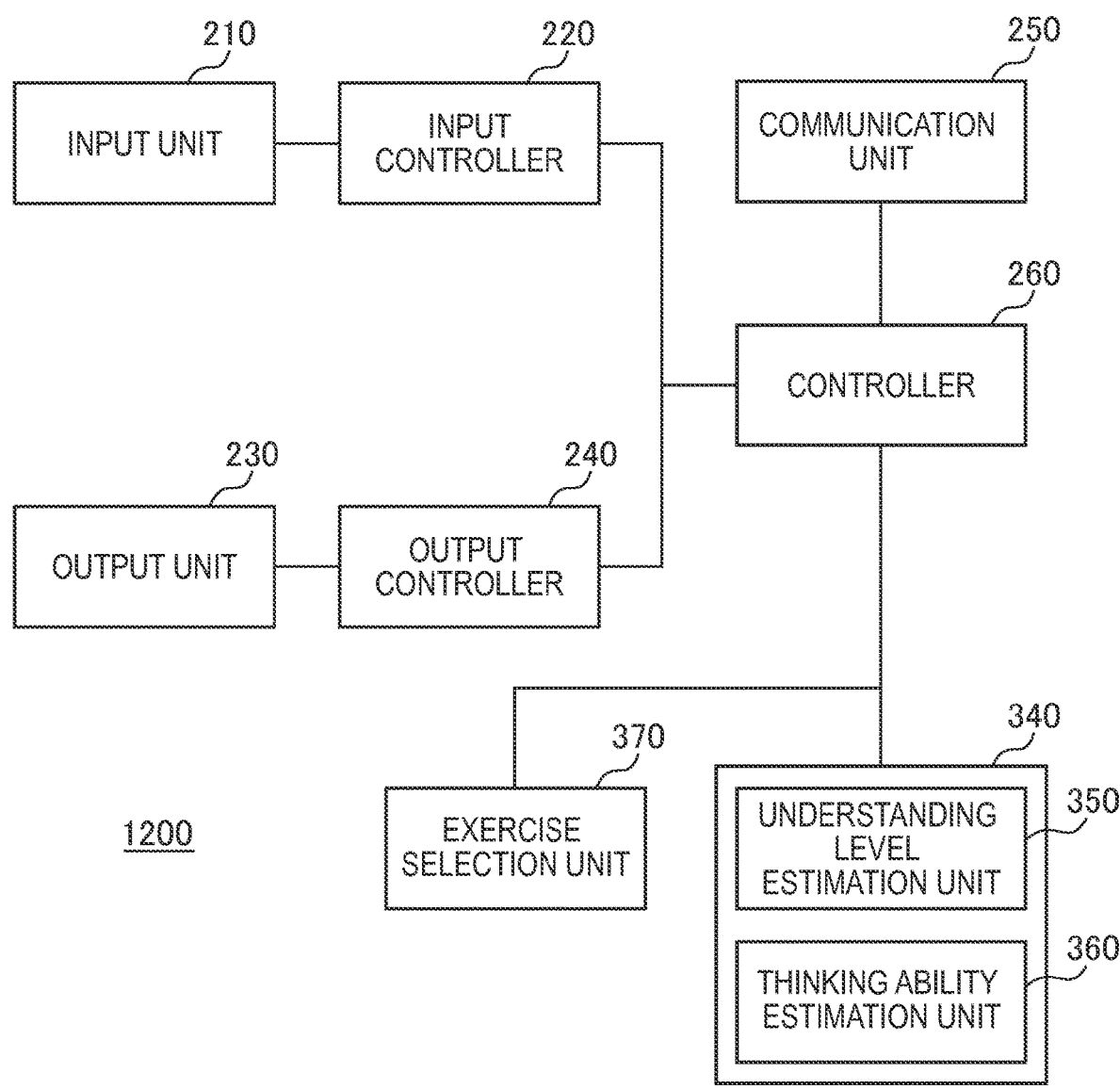
FIG. 14 is a block diagram illustrating a schematic functional configuration of an administrator terminal according to the second embodiment of the present disclosure.

FIG. 14 is a block diagram illustrating a schematic functional configuration of an administrator terminal according to the second embodiment of the present disclosure. Referring to FIG. 14, the administrator terminal 1200 includes an input unit 210, an input controller 220, an output unit 230, an output controller 240, a communication unit 250, a controller 260, an acceptance ability estimation unit 340, and an exercise selection unit 370. In addition, these functional configurations may be implemented, for example, using a hardware configuration of the information processing device to be described later. For example, the input controller 220, the output controller 240, the controller 260, the acceptance ability estimation unit 340, and the exercise selection unit 370 may be implemented in software using a CPU, a RAM, a ROM, and so on.

These structural elements may have the same configuration as those described as the structural elements of the administrator terminal 200 or the server 300 in the first embodiment described above and denoted with the same reference numerals, except for the controller 260. In other words, the administrator terminal 1200 may be a combination of the administrator terminal 200 and the analysis server 300a in the first embodiment. These structural elements can be sufficiently explained by replacing "intra-transmission" and "inter-device communication" in the description of the first embodiment with each other. Thus, repeated explanation of these structural elements is omitted.

The controller 260 controls each component of the administrator terminal 1200. For example, the controller 260 transmits a given input operation of an administrator provided from the input controller 220 to the server 300 through the communication unit 250. In addition, the controller 260 provides results obtained by the estimation of the acceptance ability estimation unit 340 to the output controller 240, or transmits the results to another administrator terminal 200 or learner terminal 100 through the communication unit 250. Furthermore, the controller 260 reads out operation history information from the operation history DB 330 of the server 300 and provides it to the acceptance ability estimation unit 340. Moreover, the controller 260 may provides results obtained by the estimation of the acceptance ability estimation unit 340 to the exercise selection unit 370.

3. Third Embodiment

Next, a third embodiment of the present disclosure will be described with reference to FIG. 15. The third embodiment is similar to the first embodiment in that the third embodiment obtains the operation history and estimates the acceptance ability based on the obtained operation history. The third embodiment is different from the first embodiment in that the third embodiment does not include a server. Thus, in the following, the difference will be mainly described.

Figure 15:
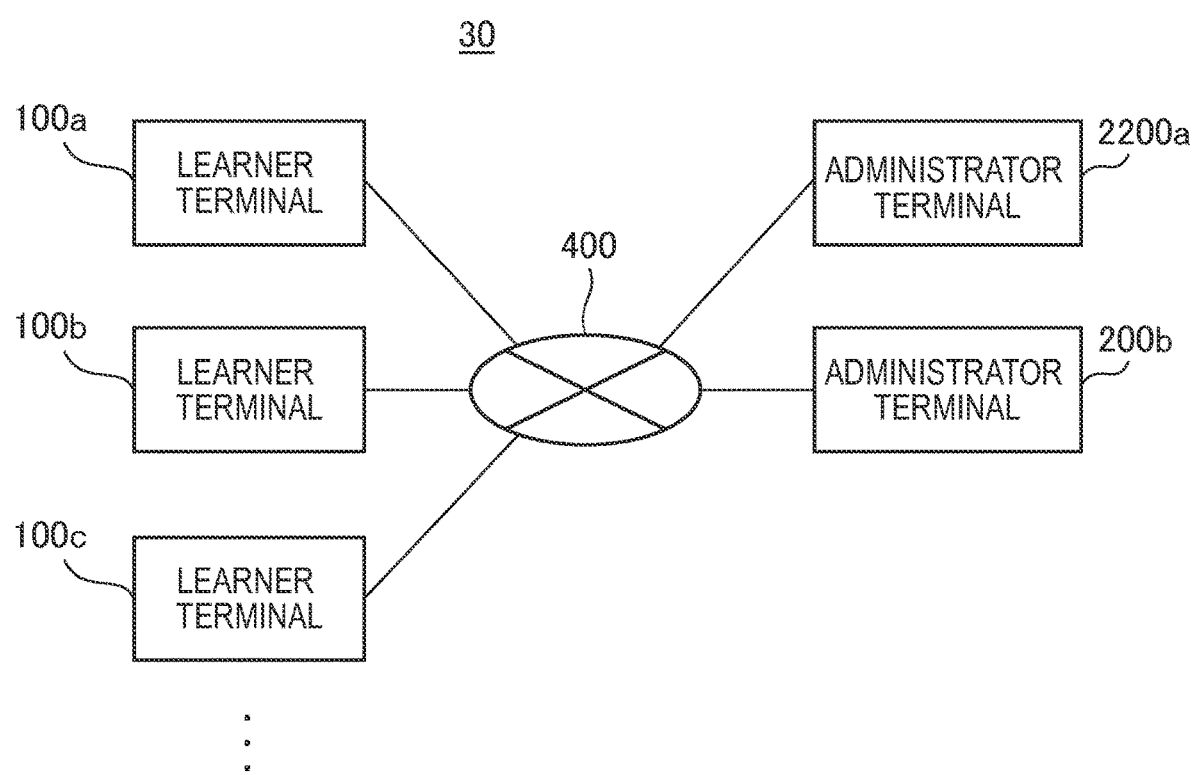
FIG. 15 is a schematic diagram illustrating a configuration of a learning system according to a third embodiment of the present disclosure.

FIG. 15 is a schematic diagram illustrating a configuration of a learning system according to the third embodiment of the present disclosure. Referring to FIG. 15, a learning system 30 includes a learner terminal 100 and an administrator terminal 200, 2200. The learner terminal 100 and the administrator terminal 200, 2200 are connected with each other by various types of wired or wireless networks 400.

The learner terminal 100 according to the third embodiment has a similar configuration to the learner terminal 100 according to the first embodiment, and thus the detailed description thereof is omitted.

The administrator terminal 2200a has functions of the analysis server 300a and the data server 300b, in addition to the similar function to the administrator terminal 200 in the first embodiment. The functional configuration of the administrator terminal 2200 is configured by adding the operation history DB 330 to the function configuration of the administrator terminal 1200 according to the second embodiment described with reference to FIG. 14. Each of the structural elements has been explained previously, and repeated explanation thereof is omitted.

In addition, the learning system 30 may include an administrator terminal 200b which is similar to that of the first embodiment, in addition to the administrator terminal 2200a. Additionally, the illustrated example is only an example, and the learning system 30 may include one or more administrator terminals 2200, or one or more administrator terminals 200 in addition to the administrator terminal 2200.

In the third embodiment of the present disclosure described above, the process for obtaining the operation history or for estimating the acceptance ability based on the obtained operation history are implemented by the administrator terminal 2200. As apparent from the second or third embodiment, in this embodiment of the present disclosure, the process for obtaining the operation history or for estimating the acceptance ability based on the obtained operation history may be distributed to a server or an administrator terminal in any form. In addition, these processes may be distributed even to a learner terminal. Alternatively, the processes for obtaining the operation history or for estimating the acceptance ability based on the obtained operation history may be performed intensively by any one of a learner terminal, an administrator terminal, and a server. In this case, a device which performs the processes for obtaining the operation history or for estimating the acceptance ability based on the obtained operation history may be the information processing device according to the embodiment of the present disclosure.

4. Hardware Configuration

Figure 16:
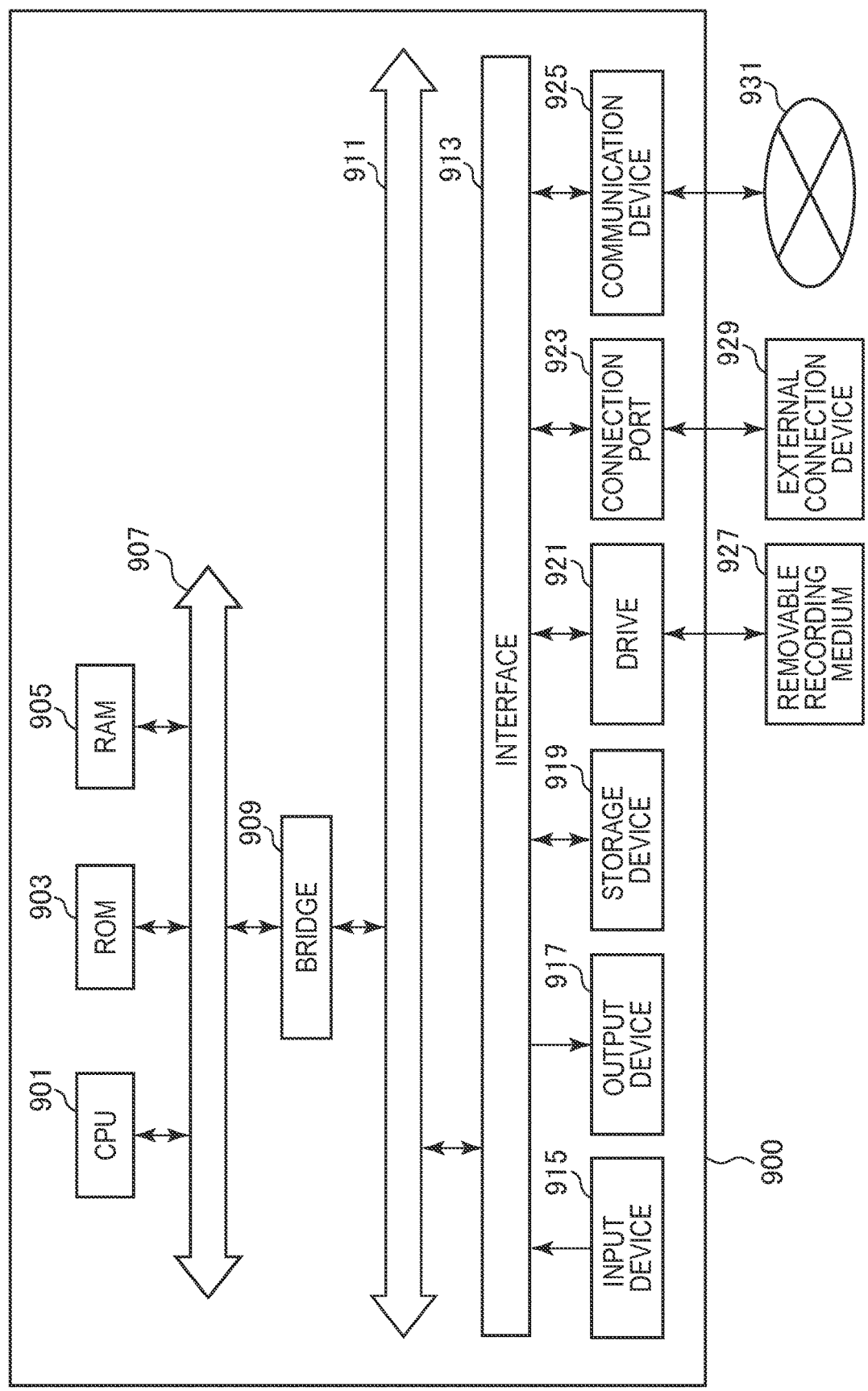
FIG. 16 is a block diagram for explaining a hardware configuration of the information processing device.

A hardware configuration of the information processing device according to the embodiment of the present disclosure will be described with reference to FIG. 16. FIG. 16 is a block diagram for explaining a hardware configuration of the information processing device. The illustrated information processing device 900 may be implemented, for example, as the learner terminal 100, the administrator terminal 200, 1200, 200, and the server 300, 1300 in the embodiments described above.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the input device may include an imaging device, various type of sensor, or the like as necessary. The information processing apparatus 900 may include a processing circuit such as a DSP (Digital Signal Processor), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 primarily stores program which are used in the execution of the CPU 901 and parameters which is appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 may be a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as LCD (Liquid Crystal Display), PDP (Plasma Display Panel), and organic EL (Electro-Luminescence) displays, an audio output device such as speaker and headphone, and a peripheral device such as printer. The output device 917 may output the results obtained from the process of the information processing apparatus 900 in a form of a video such as text or image, and an audio such as voice or sound.

The storage device 919 is a device for data storage which is configured as an example of a storage unit of the information processing apparatus 900. The storage device 919 includes, for example, a magnetic storage device such as HDD (Hard Disk Drive), a semiconductor storage device, an optical storage device, or a magneto-optical storage device.

The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 can write in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

As above, the exemplary hardware configuration of the information processing apparatus 900 has been described. Each of the above-described constituent elements may be configured using general-purpose members, or may be configured by hardware specialized to the function of each constituent element. Therefore, a hardware configuration to be used may be appropriately modified according to the technical level at the time of implementing the embodiment.

5. Supplement

It should be understood by those skilled in the art that various modifications, combinations, sub-combinations and alterations may occur depending on design requirements and other factors insofar as they are within the scope of the appended claims or the equivalents thereof.

The embodiments of the present disclosure, as described above, may include the information processing apparatus, information processing system, information processing method, program for causing a computer to function as the information processing apparatus, and recording medium which records therein the program.

Additionally, the present technology may also be configured as below.

(1) An information processing device including:
an operation history acquisition unit for acquiring operation history information in which an input operation of a learner terminal by a learner who uses learning content is associated with a time at which the input operation is acquired; and
an acceptance ability estimation unit for estimating an acceptance ability of the learner with regard to the learning content based on the operation history information.

(2) The information processing device according to (1), wherein the acceptance ability estimation unit estimates the acceptance ability by calculating a necessary time period of the input operation based on the operation history information and by comparing the necessary time period with a necessary time period of another learner.

(3) The information processing device according to (2), wherein the operation history acquisition unit acquires instruction operation history information in which an instruction input operation of an administrator terminal used by an administrator of the learner is associated with a time at which the instruction input operation is acquired, and
wherein the acceptance ability estimation unit calculates the necessary time period as a time period taken from the instruction input operation to the input operation based on the operation history information and the instruction operation history information.

(4) The information processing device according to (2) or (3),
wherein the operation history acquisition unit acquires the operation history information corresponding to an answer to a question relevant to the learning content, and
wherein the acceptance ability estimation unit calculates the necessary time period for each question.

(5) The information processing device according to any one of (1) to (4),
wherein the operation history acquisition unit acquires the operation history information corresponding to the input operation including a cancel operation, and
wherein the acceptance ability estimation unit estimates the acceptance ability by calculating a number of cancel operations and by comparing the number of cancel operations with a number of cancel operations of another learner.

(6) The information processing device according to (5), wherein the operation history acquisition unit acquires instruction operation history information in which an instruction input operation of an administrator terminal used by an administrator of the learner is associated with a time at which the instruction input operation is acquired, and
wherein the acceptance ability estimation unit calculates the number of cancel operations for each input operation corresponding to the instruction input operation based on the operation history information and the instruction operation history information.

(7) The information processing device according to (5) or (6),
wherein the operation history acquisition unit acquires the operation history information corresponding to an answer to a question relevant to the learning content, and
wherein the acceptance ability estimation unit calculates the number of cancel operations for each question.

(8) The information processing device according to any one of (1) to (7), further including:
an exercise selection unit for selecting an exercise relevant to the learning content provided to the learner depending on the acceptance ability.

(9) The information processing device according to any one of (1) to (8), wherein information indicating the acceptance ability is provided to an administrator terminal used by an administrator of the learner.

(10) The information processing device according to (9), wherein the information indicating the acceptance ability is provided as information for changing a display of information indicating the learner in the administrator terminal.

(11) The information processing device according to any one of (1) to (10), wherein the acceptance ability estimation unit includes an understanding level estimation unit configured to estimate an understanding level with regard to the learning content of the learner.

(12) The information processing device according to (11), wherein the understanding level estimation unit estimates the understanding level by calculating a necessary time period of the input operation based on the operation history information and by comparing the necessary time period with a predetermined threshold.

(13) The information processing device according to (12), wherein the operation history acquisition unit acquires the operation history information corresponding to an answer to a question relevant to the learning content, and
wherein the understanding level estimation unit estimates the understanding level by comparing the necessary time period with an average value of necessary time periods of other learners having an identical decision as to whether the answer to the question is correct or incorrect.

(14) The information processing device according to any one of (11) to (13),
wherein the operation history acquisition unit acquires the operation history information corresponding to the input operation including a cancel operation, and
wherein the understanding level estimation unit estimates the understanding level by calculating a number of cancel operations and by comparing the number of cancel operations with a predetermined threshold.

(15) The information processing device according to (14), wherein the operation history acquisition unit acquires the operation history information corresponding to an answer to a question relevant to the learning content, and
wherein the understanding level estimation unit estimates the understanding level by comparing the number of cancel operations with an average value of a number of cancel operations of other learners having an identical decision as to whether the answer to the question is correct or incorrect.

(16) The information processing device according to any one of (1) to (15), wherein the acceptance ability estimation unit includes a thinking ability estimation unit configured to estimate a thinking ability when the learner answers a question relevant to the learning content.

(17) The information processing device according to (16), wherein the thinking ability estimation unit classifies the learner depending on the thinking ability.

(18) The information processing device according to (17), wherein the operation history acquisition unit acquires the operation history information corresponding to the input operation including a cancel operation, and
wherein the thinking ability estimation unit estimates the thinking ability by calculating a necessary time period of the input operation based on the operation history information, calculating a number of cancel operations, and comparing at least one of the necessary time period and the number of cancel operations with a predetermined threshold.

(19) The information processing device according to (18), wherein the acceptance ability estimation unit includes an understanding level estimation unit configured to estimate an understanding level of the learner with regard to the learning content, and
wherein the thinking ability estimation unit estimates the thinking ability by comparing the necessary time period and the number of cancel operations with an average value of other learners having a common understanding level.

(20) An information processing method including:
acquiring operation history information in which an input operation of a learner terminal by a learner who uses learning content is associated with a time at which the input operation is acquired; and
estimating an acceptance ability of the learner with regard to the learning content based on the operation history information.

The present disclosure contains subject matter related to that disclosed in Japanese Priority Patent Application JP 2012-115605 filed in the Japan Patent Office on May 21, 2012, the entire content of which is hereby incorporated by reference.

What is claimed is:

1. An information processing device, comprising:
at least one processor configured to:
control, via a network, communication of the information processing device with a learner terminal and an administrator terminal, wherein the learner terminal is associated with a first learner and the administrator terminal is associated with an administrator of the first learner;
determine learning content to be displayed on a display screen of the learner terminal, wherein
the learning content is determined based on a mode selected at the administrator terminal, and
the learning content is for the first learner;
acquire operation history information from the learner terminal, wherein the operation history information indicates a first association of an input operation of the first learner for the learner terminal with a first time point of acquisition of the input operation of the first learner;
acquire instruction operation history information from the administrator terminal, wherein the instruction operation history information indicates a second association of an instruction input operation of the administrator for the administrator terminal with a second time point of acquisition of the instruction input operation of the administrator;
determine a first relative time period for the first learner based on:
a first time period between the input operation of the first learner and the instruction input operation of the administrator, and
an average value of time periods of a plurality of second learners that has a decision identical to the first learner;
determine a first number of relative cancel operations for the first learner based on a number of cancel operations of the first learner and an average number of cancel operations of the plurality of second learners, wherein
the number of cancel operations of the first learner corresponds to the input operation of the first learner for the instruction input operation of the administrator,
the operation history information corresponds to an answer to a question of a first plurality of questions, and
each of the first plurality of questions is associated with the learning content;
compare the first relative time period for the first learner with the average value of the time periods of the plurality of second learners to generate a first comparison result;
compare the first number of relative cancel operations for the first learner with the average number of cancel operations of the plurality of second learners to generate a second comparison result;
determine an acceptance ability of the first learner with regard to the learning content based on the first comparison result and the second comparison result, wherein
the acceptance ability includes an understanding level of the first learner and a thinking ability of the first learner, and
the understanding level indicates a degree of understanding of the first learner with regard to the learning content;
transmit ability information to the administrator terminal of the administrator of the first learner, wherein
the ability information includes the determined acceptance ability,
the administrator terminal sorts a list of learners and a list of notebook images based on the acceptance ability,
the list of learners includes the first learner and the plurality of second learners,
the list of notebook images includes a notebook image associated with the first learner and notebook images associated with the plurality of second learners, and
the administrator terminal displays the sorted list of learners and the sorted list of notebook images;
classify the first learner as a specific type of learner based on the thinking ability of the first learner and the understanding level of the first learner;
select, as an exercise, a second plurality of questions for the first learner based on the classification of the first learner; and
transmit the exercise to the learner terminal, wherein the selected exercise is displayable on the display screen of the learner terminal.

2. The information processing device according to claim 1, wherein the at least one processor is further configured to:
calculate the first time period of the input operation of the first learner based on the operation history information; and
compare the first time period with a second time period of an input operation of a third learner that has learned the learning content prior to the first learner.

3. The information processing device according to claim 1, wherein the at least one processor is further configured to calculate a third time period between the instruction input operation of the administrator and the input operation of the first learner based on the operation history information and the instruction operation history information.

4. The information processing device according to claim 1, wherein the at least one processor is further configured to calculate the first time period of the input operation of the first learner for each of the first plurality of questions.

5. The information processing device according to claim 1, wherein the operation history information corresponds to the input operation that includes a cancel operation.

6. The information processing device according to claim 1, wherein the at least one processor is further configured to determine the number of cancel operations for each of the first plurality of questions.

7. The information processing device according to claim 1, wherein the at least one processor is further configured to:
   determine the understanding level of the first learner to be high based on the first relative time period for the first learner that is less than a high level threshold value of a second relative time period; and
   determine the understanding level of the first learner to be low based on the first relative time period for the first learner that is larger than a low level threshold value of the second relative time period.

8. The information processing device according to claim 1, wherein the at least one processor is further configured to:
   determine the understanding level of the first learner to be high based on the first number of relative cancel operations for the first learner that is less than a high level threshold value of a second number of relative cancel operations; and
   determine the understanding level of the first learner to be low based on the first number of relative cancel operations for the first learner that is larger than a low level threshold value of the second number of relative cancel operations.

9. The information processing device according to claim 1, wherein
   the at least one processor is further configured to determine the thinking ability based on answers from the first learner for each of the first plurality of questions associated with the learning content.

10. The information processing device according to claim 9, wherein the at least one processor is further configured to:
    determine the understanding level of the first learner with regard to the learning content;
    compare the first time period of the input operation of the first learner with a third time period of an input operation of a fourth learner, wherein an understanding level of the fourth learner is comparable to the understanding level of the first learner; and
    determine the thinking ability based on the comparison of the first time period of the input operation of the first learner with the third time period of the input operation of the fourth learner.

11. The information processing device according to claim 1, wherein the mode selected at the administrator terminal is one of a lesson mode, an exercise mode, or a test mode.

12. The information processing device according to claim 1, wherein the input operation of the first learner includes at least one of a text input operation or a graphics input operation.

13. An information processing method, comprising:
    in an information processing device communicating with a learner terminal and an administrator terminal via a network, wherein the learner terminal is associated with a first learner and the administrator terminal is associated with an administrator of the first learner:
        determining learning content for displaying on a display screen of the learner terminal, wherein the learning content is determined based on a mode selected at the administrator terminal, and the learning content is for the first learner;
    acquiring operation history information from the learner terminal, wherein the operation history information indicates a first association of an input operation of the first learner for the learner terminal with a first time point of acquisition of the input operation of the first learner;
    acquiring instruction operation history information from the administrator terminal, wherein the instruction operation history information indicates a second association of an instruction input operation of the administrator for the administrator terminal with a second time point of acquisition of the instruction input operation of the administrator;
    determining a first relative time period for the first learner based on:
        a first time period between the input operation of the first learner and the instruction input operation of the administrator, and
        an average value of time periods of a plurality of second learners that has a decision identical to the first learner;
    determining a first number of relative cancel operations for the first learner based on a number of cancel operations of the first learner and an average number of cancel operations of the plurality of second learners, wherein
        the number of cancel operations of the first learner corresponds to the input operation of the first learner for the instruction input operation of the administrator,
        the operation history information corresponds to an answer to a question of a first plurality of questions, and
        each of the first plurality of questions is associated with the learning content;
    comparing the first relative time period for the first learner with the average value of the time periods of the plurality of second learners to generate a first comparison result;
    comparing the first number of relative cancel operations for the first learner with the average number of cancel operations of the plurality of second learners to generate a second comparison result;
    determining an acceptance ability of the first learner with regard to the learning content based on the first comparison result and the second comparison result, wherein
        the acceptance ability includes an understanding level of the first learner and a thinking ability of the first learner, and
        the understanding level indicates a degree of understanding of the first learner with regard to the learning content;
    transmitting ability information to the administrator terminal of the administrator of the first learner, wherein
        the ability information includes the determined acceptance ability,
        the administrator terminal sorts a list of learners and a list of notebook images based on the acceptance ability,
        the list of learners includes the first learner and the plurality of second learners,
        the list of notebook images includes a notebook image associated with the first learner and notebook images associated with the plurality of second learners, and the administrator terminal displays the sorted list of learners and the sorted list of notebook images;

classifying the first learner as a specific type of learner based on the thinking ability of the first learner and the understanding level of the first learner;

selecting, as an exercise, a second plurality of questions for the first learner based on the classification of the first learner; and transmitting the exercise to the learner terminal, wherein the selected exercise is displayable on the display screen of the learner terminal.

\* \* \* \* \*